(12) United States Patent
Hussain et al.

(10) Patent No.: US 11,961,054 B1
(45) Date of Patent: Apr. 16, 2024

(54) WASTE MANAGEMENT SYSTEM

(71) Applicant: Prince Mohammad Bin Fahd University, Dhahran (SA)

(72) Inventors: Ahmed Abul Hussain, Dhahran (SA); Munirah Mohammed Aldossary, Dhahran (SA); Fadia Ezzat Elhamami, Dhahran (SA); Lamya Saad Alqahtani, Dhahran (SA); Ahmed Abul Hasanaath, Dhahran (SA); Hiren Mewada, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

(21) Appl. No.: 18/498,591

(22) Filed: Oct. 31, 2023

(51) Int. Cl.
  *G06Q 10/30* (2023.01)
  *B65F 1/00* (2006.01)
  *B65F 1/14* (2006.01)

(52) U.S. Cl.
  CPC ........... *G06Q 10/30* (2013.01); *B65F 1/0033* (2013.01); *B65F 1/14* (2013.01); *B65F 2210/138* (2013.01)

(58) Field of Classification Search
  CPC ......... G06Q 10/30; B65F 1/0033; B65F 1/14; B65F 2210/138
  See application file for complete search history.

(56) References Cited

U.S. PATENT DOCUMENTS

| | | | | |
|---|---|---|---|---|
| 11,651,334 B1 * | 5/2023 | Megyese | ............ | G06Q 30/0208 705/308 |
| 2018/0016096 A1 * | 1/2018 | Krishnamurthy | ......... | B65F 1/14 |
| 2019/0283963 A1 * | 9/2019 | Al-Ateeq | ............. | B65F 1/1426 |

FOREIGN PATENT DOCUMENTS

| | | |
|---|---|---|
| CN | 214058730 U | 8/2021 |
| IN | 201911029176 | 1/2021 |

OTHER PUBLICATIONS

Sirawattananon et al.; Designing of IoT-based Smart Waste Sorting System with Image-based Deep Learning Applications; 2021 18th International Conference on Electrical Engineering/Electronics, Telecommunications and Information Technology; May 19-22, 2021; Abstract Only; 1 Page.

(Continued)

*Primary Examiner* — Jan P Mincarelli
(74) *Attorney, Agent, or Firm* — Oblon, McClelland, Maier & Neustadt, L.L.P.

(57) ABSTRACT

A waste management system includes a waste management device, a monitoring unit, and a communication unit. The waste management device includes a collection unit, a classification unit, a segregation unit, a plurality of sensors, a power unit, and a plurality of waste bins. The collection unit collects one or more waste articles. The classification unit utilizes a machine-learning model and identifies a waste category of the one or more waste articles. The segregation unit transports the one or more waste articles to a particular waste bin corresponding to the identified waste category. The power unit supplies power to the waste management device. The monitoring unit monitors the waste management device and controls a resultant action. The communication unit communicates one or more data between a control station and the waste management device using a plurality of IoT devices.

20 Claims, 12 Drawing Sheets

(56) References Cited

OTHER PUBLICATIONS

Aarif et al. ; Smart bin: Waste segregation system using deep learning—Internet of Things for sustainable smart cities Concurrency and Computation Practice and Experience, vol. 34, Issue 28 ; Dec. 25, 2022 ; Abstract Only ; 1 Page.

* cited by examiner

WASTE MANAGEMENT SYSTEM

BACKGROUND

Technical Field

The present disclosure is directed to a device, method, and system for waste management through waste classification and segregation, more generally, a device using a machine learning based method for waste classification and external monitoring and control for efficient disposal and recycling of waste in a sustainable and environmentally friendly manner.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Due to rapid growth of population, human beings produce a huge amount of waste on a daily basis. To handle such enormous amounts of waste, waste management is considered as a potential solution. Waste management refers to collecting waste, delivering waste to non-residential locations, correct disposal of waste, recycling recyclable items, and monitoring waste. To dispose of and recycle the waste effectively, waste segregation is an important part of waste management. Waste segregation refers to a process of separating waste articles into different groups, generally, four main groups such as, organic, inorganic, recyclable, and hazardous. It is a critical requirement since it enables recycling, reuse, treatment, and scientific disposal of different components of waste. A huge amount of manpower is required for the process of segregation before the disposal of waste or before the recycling process. Improper waste management has led to an increase in the cost of recycling and has led to more working hours.

To perform waste segregation at ground level, color-coded dustbins (waste bins) are placed in public places, and people are encouraged to dispose of the waste articles in an appropriate dustbin. For example, a red dustbin is used for waste that is not biodegradable, and a green dustbin is used for wet and biodegradable waste. However, it is not very effective, as not every urban resident is familiar with the color-coded dustbins. Lack of awareness among people is also creating hindrances in the efficient management of waste. Another issue faced by current waste management systems is improper scheduling of emptying the dustbins; that is, municipal and commercial waste collectors are not notified when a waste bin is full and that they have to pick up the waste. Human interference is equally problematic in collecting, transportation, and efficient waste disposal.

The waste bins, placed in public places, must be replaced before they overflow and/or produce a bad odor. For eliminating or mitigating the garbage's odor and maintaining cleanliness, several waste management systems have been proposed. For example, the Internet of Things (IoT) may be used as a substitute for human interaction to an extent by employing real-time data interchange and focusing on problems of waste management. These technologies can provide real-time information about the waste and an optimized schedule for waste collection, reducing the cost and time of the overall process.

Accordingly, there is a need for a smart waste management system, specifically a waste management system that utilizes technology developments such as machine learning based methods for efficient waste classification, waste segregation-based disposal, and recycling of waste in a sustainable and environmentally friendly manner. Such a waste management system should be capable of generating notifications on bin fullness, generation of odor from waste and disposal of any harmful objects in the waste. The embodiments disclosed herein meet such needs.

SUMMARY

In an exemplary embodiment, a waste management system is described. The system includes a waste management device, a monitoring unit, a monitoring unit, and a communication unit. The waste management device includes a collection unit, a classification unit, a segregation unit, a plurality of sensors, and a power unit in a top section of the waste management device. Further, the system includes a plurality of waste bins in a bottom section of the waste management device. A barrier is configured to separate the collection unit and the plurality of waste bins. The collection unit is configured to collect one or more waste articles. The classification unit includes a proximity sensor, a camera and a lamp mounted on an interior surface of the collection unit; wherein the proximity sensor is configured to sense the one or more waste articles in the collection unit and activate the camera and the lamp; wherein the lamp is configured to illuminate the collection unit having the one or more waste articles, and wherein the camera is configured to capture an image of the one or more waste articles in the collection unit. The classification unit further includes a machine-learning model and identify a waste category of the one or more waste articles. The segregation unit is configured to transport the one or more waste articles from the collection unit to a particular waste bin corresponding to the identified waste category using a stepper motor-controlled sorting pipe. The power unit is configured to supply power to the waste management device. The monitoring unit is configured to monitor the waste management device. The communication unit is configured to communicate one or more data between a control station and the monitoring unit using a plurality of IoT devices.

In an aspect, the classification unit of the waste management device further includes a microprocessor configured to process the machine-learning model to identify the waste category using the image of the one or more waste articles, wherein the classification unit further comprises an IR sensor configured to identify a temperature above a trigger threshold indicative of burning or smoldering waste article, wherein the microprocessor is configured to identify the burning or smoldering waste article as a cigarette and the segregation unit is configured to direct the burning or smoldering waste article in a cigarette waste bin comprising a separation plate, and wherein the separation plate is triggered to open and permit passage of the burning or smoldering waste into a cavity of the cigarette waste bin then close and seal the burning or smoldering waste in the cigarette waste bin.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
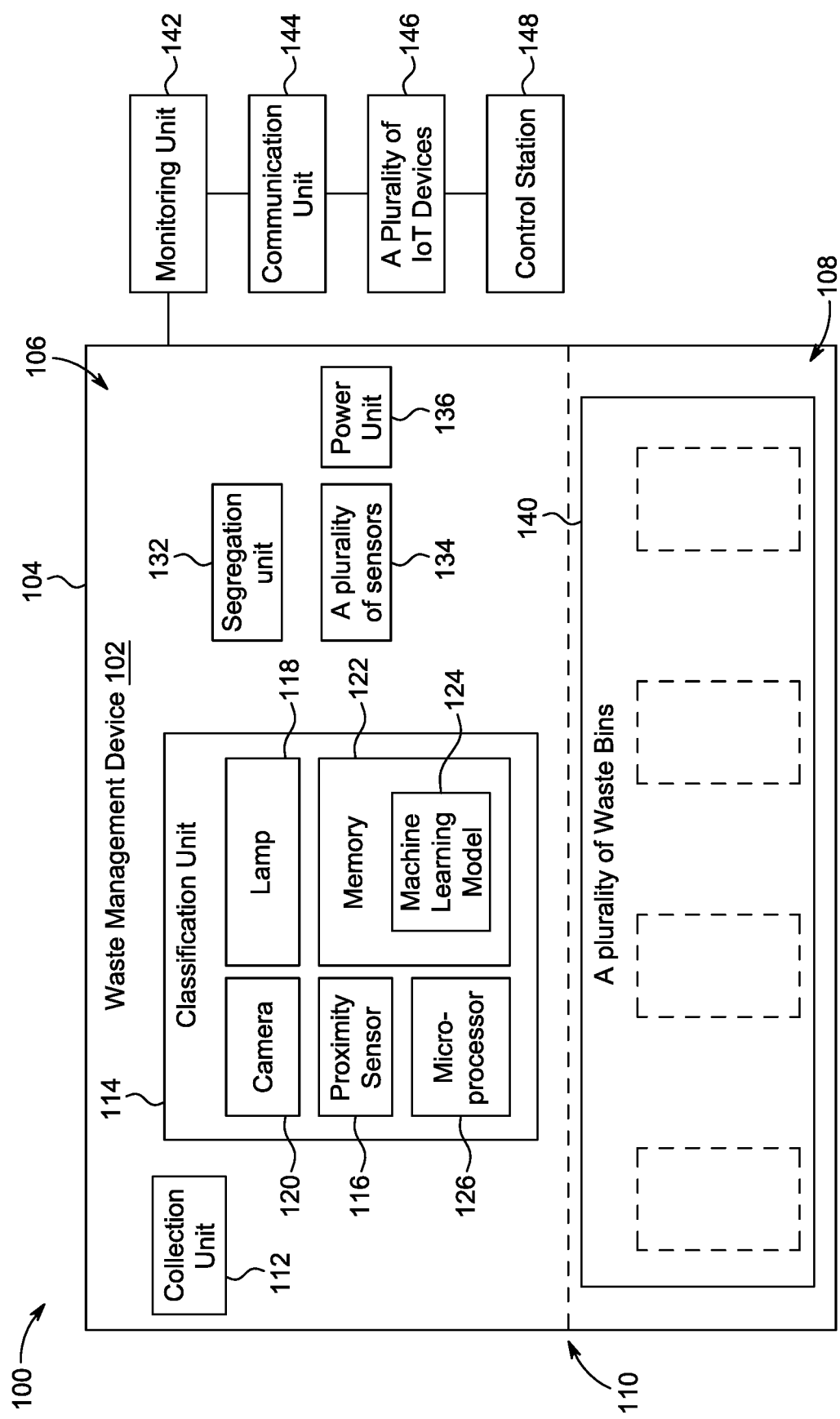
FIG. 1 illustrates a network diagram of a waste management system, according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms refer to ranges that include the identified value within a margin of 20%, 10%, or preferably 5%, and any values there between.

Aspects of the embodiments disclosed herein are directed to a waste management system. The waste management system includes a waste management device, a monitoring unit and integration to a control station. The control station is configured to receive the data from the waste management system and predict a time to collect the waste from a plurality of waste bins assembled in the waste management device. The waste management system employs a real-time waste classification and segregation by employing IoT devices and machine learning (ML) model. Using the ML model, the system is configured to automatically classify waste items into different waste categories, such as, for example, at least five waste categories including paper, metal, plastic/glass, organic waste, cigarette butts. Embodiments disclosed herein exhibit a minimum accuracy of 95%. After classifying the waste items into different waste categories, the waste management system segregates and disposes each waste item into a designated waste bin. The IoT devices can be connected to the control station through a variety of methods including cellular, satellite, Wi-Fi, Bluetooth, low-power wide-area networks (LPWAN), or connecting directly to the internet via ethernet.

In various aspects of the disclosure, non-limiting definitions of one or more terms that will be used in the document are provided below.

The term "microprocessor" as used herein refers to a computer component adapted to control a system to achieve certain desired goals and objectives. For example, the microcontroller may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term "sensor" refers, without limitation, to the component or region of a device which is configured to detect the presence or absence of a measurable parameter. For example, the sensor may be a light sensor configured to detect the presence or absence of light, or a distance between objects detected using light reflected off one or both objects. The sensor may also be an ultrasonic sensor as a component in an ultrasonic transducer which includes both a unit of an ultrasonic actuator and the ultrasonic sensor, serving as a transmitter and a receiver, respectively, together in a pulse-echo ranging measurement method using ultrasonic waves.

The term "machine learning" refers to a method of data analysis that automates analytical model building. Machine learning is a branch of AI that uses statistical techniques to give computer systems the ability to learn from data, without being explicitly programmed.

Referring to drawings, FIG. 1 illustrates a network diagram of a waste management system 100 (hereinafter interchangeably referred to as "the system 100"), according to one or more aspects of the embodiments disclosed herein. The system 100 includes a waste management device 102, a monitoring unit 142, a communication unit 144, a plurality of IoT devices 146, and a control station 148. The system 100 may include a plurality of waste management devices, where each waste management device is configured to exchange data with each other. Each of the plurality of waste management devices 102 has a unique ID. In an operative aspect, the plurality of waste management device 102 is registered with the control station. For simplifying the explanation of the operation of system 100, the present disclosure uses single waste management device 102. However, the disclosure is equally applicable to multiple management devices.

As shown in FIG. 1, the waste management device 102 includes a collection unit 112, a classification unit 114, a segregation unit 132, a plurality of sensors 134, a power unit 136, and a plurality of waste bins 140. The system 100 is configured to collect and segregate waste articles and dispose of the segregated litter into the plurality of waste bins 140. The waste management device 102 further includes a water tank and a water sprinkler unit (not shown here for simplicity).

The waste management device 102 has a housing 104 that is configured to house the various components of the waste management device 102. For example, but not by way of limitation, the housing 104 of the present invention may be square, rectangular, oval, circular, elliptical, triangular, hexagonal, or octagonal shapes, or any other polygonal shape, or any combination of such shapes. The housing 104 is made of material that is rust-free, or non-rusting, corrosion-resistant and/or acid-resistant. The housing 104 may be made of plastic, an insulating material, or metal, such as galvanized steel.

The housing 104 includes two sections: a top section 106 and a bottom section 108. A barrier 110 is in the top section 106 and is configured to separate the top section 106 and the bottom section 108 of the waste management device 102. In an example, there can be more than two sections in the housing 104. In aspect, the top section 106 is further divided into two parts referred to as an upper half and a lower half. In an example, the collection unit 112, the classification unit 114, a stepper motor of the segregation unit 132, the plurality of sensors 134, and the power unit 136 are located in the upper half of the top section 106 of the waste management device 102, and a sorting pipe of the segregation unit 132 is located in the lower end of the top section 106 of the waste management device 102.

The collection unit 112 is configured to collect one or more waste articles. In a structural aspect, the collection unit 112 has a "basket-like" structure where a user disposes of the waste articles. The collection unit 112 has an opening at the top for disposing the waste article. The barrier 110 is located at the bottom of the collection unit 112. The classification unit 114 is cooperatively coupled to the collection unit 112 in between the opening at the top and the barrier 110 at the bottom. The classification unit 114 includes a proximity sensor 116, a lamp 118, a camera 120, a memory 122 having a machine-learning model 124, and a microprocessor 126.

The proximity sensor 116 is configured to detect a physical movement in a predefined surrounding of the waste management device 102. The physical movement indicating for example, depositing a waste article in the collection unit 112. To detect such a physical movement, the proximity sensor 116 is located on the interior surface and around the periphery of the opening of the collection unit 112. In an example, the proximity sensor 116 may be a group of sensors located at a distance from each other around the periphery of the opening of the collection unit 112, in order to detect the disposal of the waste articles in the collection unit 112 from all possible angles.

After detecting any physical movement, the proximity sensor 116, connected to the microprocessor 126, is configured to activate the lamp 118 and the camera 120. The camera 120 is configured to capture an image of the one or more waste articles collected in the collection unit 112 using illumination from the lamp 118. In an example, the camera 120 is located on an interior surface of the collection unit 112, so it is able to capture the image of the waste article with more clarity. Once a waste article is deposited, it may rest on the barrier 110, which is in a closed state until triggered to open. The camera 120 is directed towards the barrier 110 in order to capture the image of the waste article. In an aspect, the camera 120 is configured to record a video of the waste articles and to process image frames of the recorded video using the microprocessor 126. In one example, the camera 120 is a near-infrared camera, a broad-spectrum infrared camera, a visible camera, and a video camera. In an example, the camera 120 is a group of cameras. The natural light inside the collection unit 112 may not be bright enough for the camera 120 to get a clear image of the waste articles. The lamp 118 is configured to illuminate the interiors of the collection unit 112. The lamp 118 is located on the interior surface of the collection unit 112. The lamp 118 may be located at a distance from the camera 120 such that it does not block a path between the lens of the camera 120 and the waste articles. The lamp 118 may be a strip of LED lights, for example, one to five LED lights for a quarter section of the collection unit 112. The strip of LED lights may be located along the periphery of the opening of the collection unit 112, close to the proximity sensor 116. In an example, the classification unit 114 is located proximal to the top edge of the collection unit 112.

The memory 122 is configured to store program instructions. The program instructions include the machine-learning model 124 that is configured to identify a quality of each image and discard any distorted images or unclear images captured by the camera 120. The machine-learning model 124 includes a dataset. The dataset includes a plurality of images of waste articles. The program instructions further include an image classifier which is trained to classify the images. In an aspect, the memory 122 is configured to store the machine-learning model 124 and a predefined dataset for training the machine-learning model 124. The program instructions include a program that implements a method for using machine-learning methods to classify each captured image in accordance with embodiments of the present disclosure and may implement other embodiments described in this specification. The memory 122 is configured to store preprocessed data. In another aspect, the memory 122 is configured to store a plurality of images, a threshold value related to the ambient light level, etc. The memory 122 may include any computer-readable medium known in the art including, for example, volatile memory, such as Static Random Access Memory (SRAM) and Dynamic Random Access Memory (DRAM) and/or nonvolatile memory, such as Read Only Memory (ROM), erasable programmable ROM, flash memories, hard disks, optical disks, and magnetic tapes.

In an operative aspect, the microprocessor 126 is cooperatively coupled to the memory 122, the proximity sensor 116, the lamp 118, the camera 120, and the segregation unit 132. The microprocessor 126 is configured to receive the captured image from the camera 120. The microprocessor 126 is configured to fetch and execute computer-readable instructions stored in the memory 122. The microprocessor 126 is configured to process the captured image using the machine-learning model 124. The microprocessor 126 is configured to execute a sequence of machine-readable instructions, which may be embodied in a program or software. The instructions can be directed to the microprocessor 126, which may subsequently program or otherwise be configured to implement the methods of the present disclosure. According to an aspect of the present disclosure, the microprocessor 126 may be implemented as one or more microprocessors, microcomputers, microcontrollers, digital signal processors, central processing units, state machines, logic circuitries, and/or any devices that manipulate signals based on operational instructions.

The classification unit 114 is configured to identify a waste category of the one or more waste articles collected in the collection unit 112 using the machine learning model 124. Using the machine-learning model 124, the classification unit 114 is configured to classify the collected one or more waste articles into one of many predetermined waste categories. For example, in the embodiments herein, six types of waste categories have been created that include paper, metal, plastic/glass, organic waste, cigarette, and other. Using the machine-learning model 124, the classification unit 114 is configured to classify the collected one or more waste articles into one of these six waste categories.

An important aspect of the classification unit 114 relates to the ability to identify waste articles that may be burning or smoldering, for example cigarettes that have not been completely extinguished. In this aspect of the waste management device, one or more infrared sensors is mounted in the "basket-like" structure of the collection unit 112. The infrared camera functions to identify waste articles above a temperature threshold (for example above 150° C., above 180° C., above 200° C., above 250° C., etc.). Waste articles that are on fire or are smoldering or are above the temperature threshold are identified as "cigarette" trash and are directed to a cigarette waste bin.

The power unit 136 is configured to supply power to the waste management device 102. The power unit 136 is connected through switches to the microprocessor 126. The power unit 136 includes a solar power supply, a battery, and an AC power source. The solar power supply is configured to convert solar energy into electrical energy. In an example, the solar power supply may be a secondary power source. The AC power source is configured to provide an AC input current at a specified AC input voltage level. In an example, the AC power source may be a primary power source. The battery is configured to recharge using the solar power supply and the AC power source. The battery is configured to recharge using a charging port. In an example, the battery is selected from the group consisting of non-aqueous lithium-ion battery, polymer lithium-ion battery and sodium sulfate battery.

The plurality of waste bins 140 is located in the bottom section 108 of the waste management device 102. The plurality of waste bins 140 of the waste management device 102 are arranged adjacent to each other. The plurality of waste bins 140 may be made out of metal, plastic, or any suitable material. The waste stored in the waste bins 140 may include, but are not limited to, garbage waste, recycling waste, organic waste, or chemical waste. The term "waste bin" may be used interchangeably with, without limitation, waste container, garbage bin, recycling bin, compost bin, or dust bin. The number of waste bins 140 in the bottom section is generally equal to at least the number of waste categories that the machine learning model 124 is trained for so as to classify the waste articles. In an example implementation, with the six waste categories including, paper, metal, plastic/glass, organic waste, cigarette, and other, there are six waste bins 140. The waste bin associated with a waste article identified as a cigarette trash is referred to as a cigarette waste bin. The cigarette waste bin is a quarantine box that is either fireproof or has a tight cone or flap to stop the ingress of oxygen.

The waste bin associated with cigarette referred to as the cigarette waste bin may include a top portion cigarette barrier similar to the barrier 110 in the top section. The cigarette barrier opens to permit entry of a waste article identified as a fire/smoldering risk upon identification of such by the classification unit based on input from an IR sensor. The barrier 110 is subsequently returned to a closed state after the fire risk waste article has been transferred to the cigarette waste bin. Then the cigarette waste bin is returned to a closed state. By maintaining the cigarette waste bin in a closed state, any article that is on fire (undergoing combustion), smoldering or otherwise at a temperature greater than a minimum threshold (e.g., 150° C., 180° C., 200° C., or 250° C.) can be quickly starved of oxygen in the cigarette waste bin cavity which is now in a closed state sealed from air.

The microprocessor 126 is configured to control the segregation unit 132 of the waste management device 102. The segregation unit 132 is configured to transport the one or more waste articles to a particular waste bin corresponding to an identified waste category. In an example, the identified waste category is at least one from a paper, a plastic, a metal, a glass, an organic waste, and a cigarette waste.

The segregation unit 132 of the waste management device 102 includes a sorting pipe and a stepper motor. The sorting pipe is configured to dispose the one or more waste articles to the plurality of waste bins 140. The sorting pipe 132 is an elongated cylindrical pipe extended from the bottom of the barrier 110 up to the top of the plurality of waste bins 140. The sorting pipe is configured to rotate in a clockwise direction and an anticlockwise direction. The stepper motor is configured to control the rotation of the sorting pipe. The microprocessor 126 generates a location of a waste bin from the plurality of waste bins 140 corresponding to the identified waste category, and accordingly controls the movement of the sorting pipe, so as to guide the sorting pipe to the waste bin corresponding to the identified waste category.

The plurality of sensors 134 are attached to the sorting pipe, proximal to a top edge of the plurality of waste bins 140. The plurality of sensors 134 is configured to generate a plurality of measurement signals (sensor data) by measuring a plurality of parameters associated with the waste management device 102. In some aspect, the plurality of sensors 134 includes a memory that is configured to store parameters or predefined settings required during resetting or rebooting of the plurality of sensors 134. The plurality of sensors 134 is selected from an infrared (IR) sensor, a gas sensor, a smoke sensor, a temperature sensor, and an ultrasonic sensor. The plurality of sensors 134 may include, but are not limited to, a fill level sensor, a humidity sensor, a pressure sensor, an air quality sensor, an ambient sensor, a motion sensor, and a location sensor. The IR sensor is an electronic device, which emits and/or detects IR light in order to sense a number of parameters of the surroundings. The IR sensors are configured to select the particular waste bin out of the plurality of waste bins corresponding to the identified waste category. The gas sensor is configured to detect a gas in each of the plurality of waste bins, which flows in contact with the gas sensor. In an example, the gas sensor is an adsorption-based gas sensor. The gas sensor is a functional unit that is capable of detecting a concentration of at least one chemical substance (gas or also liquid) and to convert this information into an electrical or optical signal.

The gas sensor is preferably a sensor that functions to identify a threshold concentration of a combustible hydrocarbon-based gas. Commercial gas sensors such as an MQ-4 gas sensor which includes a tin oxide layer embedded with a gold electrode in an aluminum oxide ceramic are especially well suited as the gas sensor. Gas is including low molecular weight hydrocarbons such as methane, ethane, propane, and natural gas can be detected.

The smoke sensor is configured to detect a smoke concentration in each of the plurality of waste bins. The temperature sensor is configured to measure a temperature of each of the plurality of waste bins. The ultrasonic sensor is configured to check a fill level of each of the plurality of waste bins. Each of the plurality of sensors 134 is configured to transmit the sensed data to the monitoring unit, or to a plurality of IoT devices connected to the control station. The plurality of sensors 134 detects the desired variables periodically on a consistent time scale, such as once a day, once every 12 hours, once every 8 hours, once every 4 hours, or once an hour.

The monitoring unit 142 is configured to monitor the waste management device 102. The monitoring unit 142 is communicably coupled to the plurality of sensors 134 and receives the generated data (reading) from the plurality of sensors 134.

The monitoring unit 142 is configured to process the received data from the plurality of sensors 134 and perform an assigned task. Corresponding to the assigned task, the monitoring unit 142 is configured to control a resultant action. The monitoring unit 142 is configured to perform a number of assigned tasks on its level, thereby reducing dependencies and processing loads on the control station 148. In an aspect, the assigned task is selected from a group including turning on a water sprinkler, turning on a water pump, communicating with a local authority when the waste bin is full, communicating with a fire station if the fire has been detected, and so on. In an example, the monitoring unit 142 is coupled to the plurality of waste management devices. The monitoring unit 142 is further configured to send the received data to the communication unit 144. In an example, the monitoring unit 142 is configured to transfer the received data along with the unique ID of each waste management device. In another example, the monitoring unit 142 is configured to combine the data received from the plurality of waste management devices and send the combined data along with a specific area code (an area where these waste bins have been placed).

The communication unit 144 is configured to communicate between the control station 148 and the waste management device 102. The communication unit 144 receives the processed data received from the monitoring unit 142. The communication unit 144 has at least one antenna for transmitting and receiving data or a resultant action to/from the control station. In some examples, at least one antenna is a near field antenna, a Wi-Fi antenna, and a radio frequency antenna. The communication unit 144 may include a wireless-frequency transceiver having a variable gain amplifier that generates radio-frequency signals for transmission. A wireless amplifier circuit may be used to amplify the radio-frequency signals at the output of the variable gain amplifier for transmission through a plurality of antennas.

In an implementation of the present disclosure, the communication unit 144 communicates the data received from the plurality of sensors 134 to the control station and stores the data in a database for further processing. The data stored in the database can be accessed by a waste bin application which may be used by the user or a government authority.

The communication unit 144 communicates the data using the plurality of IoT devices 146. In an example, the plurality of IoT devices 146 may be an IoT gateway, repeater, hub, bridge, switch, routers, and network interface card (NIC). For example, the IoT gateway provides a bridge between different communication technologies acting as a medium to open up connections between a cloud network and control station (sensors/devices) in IoT. In an aspect, the sensors 134 disposed inside the waste management device 102 are IoT sensors that can connect with other IoT sensors in neighboring waste management devices to share sensor data through an IoT gateway.

In an aspect, the waste management device 102 includes a location sensor. The location sensor includes a global positioning system (GPS) receiver and/or cellular adapter elements. The location sensor's working principle may be based on GPS and cellular network internet connectivity. GPS is a satellite-based navigation system that provides geolocation and time information to a GPS receiver anywhere on or near the Earth where there is an unobstructed line of sight to four or more GPS satellites. The GPS part of location sensors are receivers with antennas that use a satellite-based navigation system with a network of satellites in orbit around the Earth to provide position, velocity, and timing information. The cellular adapter element of the location sensor enables cellular internet connectivity. The microprocessor is operatively connected to the GPS unit to receive the location coordinates of the waste management device 102.

The plurality of IoT devices 146 include an IoT platform to display the one or more data to the control station. For example, the plurality of IoT devices 146 include sensors such as the temperature sensor, the gas sensor, the smoke sensor, and the ultrasonic sensor. The one or more data generated using the plurality of IoT devices 146 include at least one selected from an alert, the fill level, a temperature range, a humidity value, a toxic gas level and a waste bin location. In an example, the IoT platform includes the database which is configured to store the one or more data generated using the plurality of IoT devices 146. In some examples, the database may be continually updated to store the data collected by the plurality of IoT devices 146. The data stored in the database may be accessible to an end user via the waste bin application (an IoT application) or browser installed on a user device. As used herein, the term 'waste bin application' refers to a set of instructions or an application designed to run on computing devices such as a mobile device, a tablet, a laptop, a pager, a personal assistant, internet protocol adapter (iPad) or a watch, to set up predetermined values for allowable methane levels, the plurality of sensors 134, access the sensors data, the location of the waste bin, the schedule and the waste fill level.

The control station 148 is configured to receive the data from the communication unit 144. The control station 148 processes the received data and generates a resultant action. For example, if the control station 148 fails to track a particular waste management device, the control station 148 is configured to reboot that particular waste management device. The control station 148 is configured to set a threshold value for each of the plurality of sensors 134. In an example, the control station 148 is configured to store a profile of each waste management device corresponding to its assigned unique ID. The profile includes various details about the waste management device such as date of deploying the waste management device, date of replacing battery, location of the waste management device, etc.

The plurality of IoT devices 146 sends corresponding real-time data to the control station 148 (also referred to as a cloud server) of the waste management system 100 via the cloud network such as a wired connection or a wireless connection. The wireless network may include but is not limited to, data-centric wireless networks, voice-centric wireless networks, and dual-mode networks. In some aspects of the present disclosure, the cloud network may include other types of computer or telecommunication networks. The cloud network connects different components of the waste management system 100 together. The cloud network can involve deploying groups of remote servers and/or software networks that allow centralized data storage and online access to computer application software or resources. These groups of remote servers and/or software networks can be a collection of remote computing services. The cloud network may contain algorithms, methods, and databases. Smart waste bin sensor device data is sent to the cloud network, stored in a database for further processing and may be accessed by the waste bin mobile application or waste collection facility application. The cloud network communicates to custom dashboards and control panels and allows for custom reporting and data download via a representational state transfer (REST) architecture which uses hypertext transfer protocol secure (HTTPS). The cloud network also communicates through an application programming interface (API) and hypertext transfer protocol (HTTP) and interfaces with other APIs.

The control station 148 may deploy groups of remote servers or software networks that allow centralized data storage and online access to computer application software or resources. Such groups may be a collection of remote computing services. The control station 148 may include algorithms, methods, and databases. The control station 148 may include one or more storage devices such as a hard disk drive (HDD), a solid-state drive (SSD), and a secure digital card (SDC); a processor; an input device such as a keyboard, a keypad, a cursor-control device, a touch-screen, a camera, and a microphone; a display device such as a computer monitor, a flat-screen display, a projector and a display panel; an output device such as a printer and a speaker; and a memory. The memory may include random access memory (RAM) or similar types of memory. As used herein, the term 'RAM' refers to the short-term memory of a computer, where the data that the processor is currently using is stored.

The monitoring unit 142 is configured to receive the resultant action from the control station 148 via the communication unit 144. The monitoring unit 142 is configured to control the waste management device based on the received resultant action. In an aspect, the monitoring unit 142 is configured to update its operating parameters.

The waste management device may be referred as "smart device" as it includes IOT sensors capable of collecting data regarding the bin and its contents. The waste management device 102 is configured to sense environmental data, such as location, temperature, and humidity. The waste management device 102 is further configured to record gas (such as methane gas) and the amount of waste in the bin. The waste management device 102 is further configured to classify a waste article into a waste category and deposit it in a corresponding waste bin using machine learning model 124.

Figure 2:
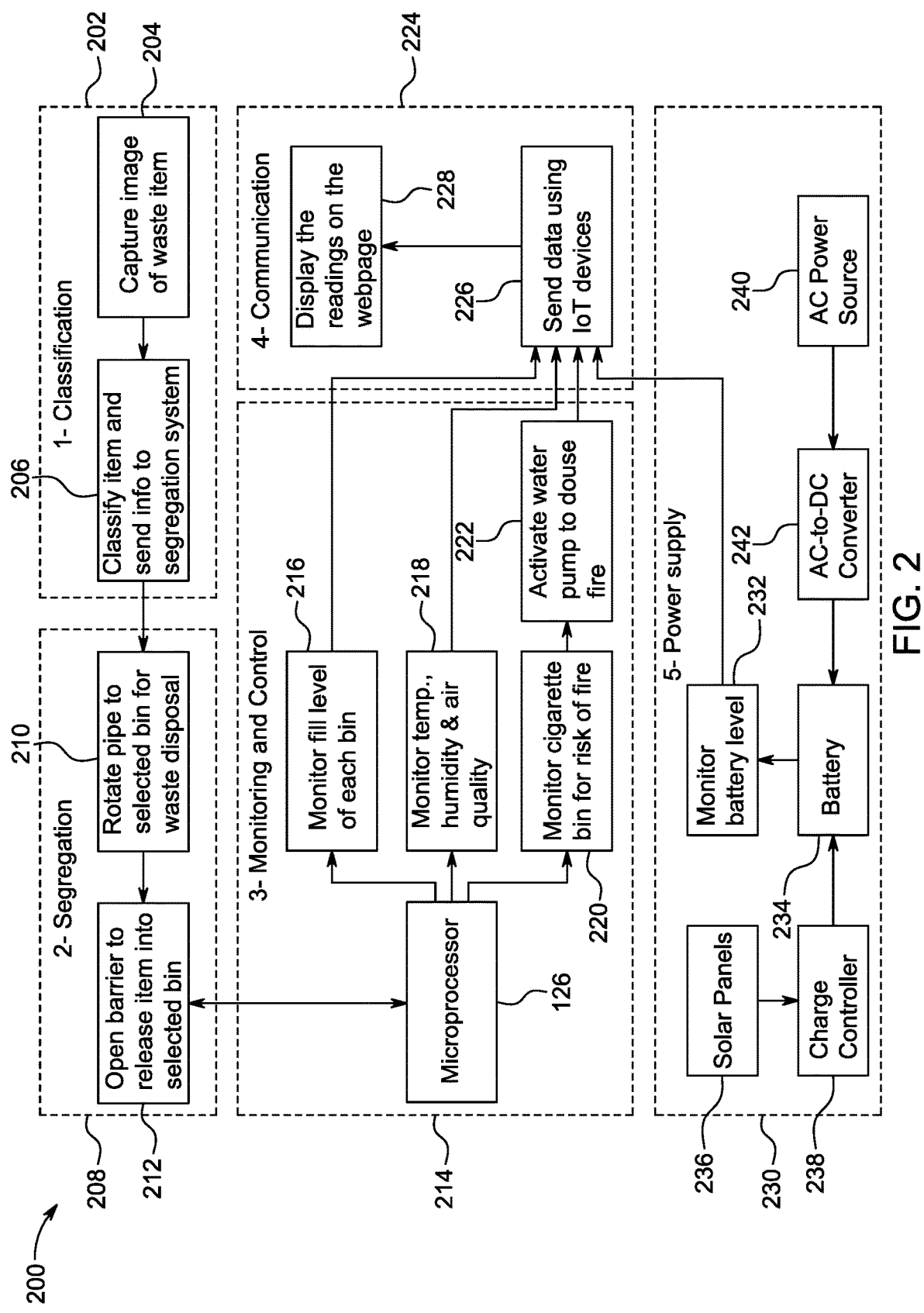
FIG. 2 illustrates an exemplary flow chart of the waste management system, according to another embodiment of the present disclosure.

FIG. 2 illustrates an exemplary flow chart 200 of the waste management system 100. The waste management system 100 is a deep learning-based smart waste management system that is able to classify and segregate waste and help to recycle the segregated waste. Referring to FIG. 2, the waste management system 100 is configured to perform mainly five steps that is, a step of classification 202 of the waste articles, a step of segregation 208 of the waste articles, a step of monitoring and controlling 214 of the waste management device 102, a step of establishing communication 224 between the waste management device 102 and the control station 148, and a step of monitoring the power 230 of the waste management device 102.

The step of classification 202 of the waste articles includes capturing an image of a waste article deposited in a collection unit 112 of the waste management device 102 using the camera 120 (as shown by step 204). Based on the captured image, the classification unit 114 classifies the waste articles and shares the information related to the classified waste articles with the segregation unit 132 (as shown by step 206). The classification unit 114 utilizes the machine-learning model 124. In an example, the classification unit 114 classifies the waste articles into five waste categories: plastic/glass, paper, organic waste, metal, and cigarettes. There is an additional bin labeled 'other' to dispose of waste articles that do not fit into the specified waste categories. In an aspect, the machine-learning model has a classifying percentage of less than 60%. During the step of classification 202, the waste articles reside on the barrier, below which the sorting pipe is positioned.

During the step of segregation 208 of the waste articles, the segregation unit 132 is configured to transport the one or more waste articles to the particular waste bin corresponding to the identified waste category based on instructions received from the microprocessor 126. Step 210 includes using the stepper motor, the segregation unit 132 rotates the sorting pipe to dispose the one or more waste articles into a corresponding selected waste bin. Step 212 includes opening the barrier such that the waste item is released into the selected waste bin.

During the step of monitoring and controlling 214 of the waste management device 102, the monitoring unit 142 monitors different aspects of the waste management device 102 and controls the resultant action. The monitoring unit 142 is configured to receive the reading from the plurality of sensors 134. Based on the received reading from the plurality of sensors 134, the monitoring unit 142 detects when the waste bins (recycle bins) are full and which waste bin is full. The microprocessor 126 is configured to perform following steps: 1. Step 216 includes monitoring fill level of each waste bin. The ultrasonic sensor is configured to check the fill level of each of the plurality of waste bins. 2. Step 218 includes monitoring temperature, humidity, and air quality of the waste management device 102. For example, a temperature sensor, a humidity sensor, and an air quality sensor are disposed in the sorting pipe to sense the various parameters associated with each of the plurality of waste bins. The temperature sensor is configured to sense an average temperature of the waste management device 102. In an example, the temperature sensor is configured to sense temperature of each of the plurality of waste bins. The humidity sensor is configured to measure humidity of each of the plurality of waste bins. The air quality sensor is configured to measure quality of air of each of the plurality of waste bins and also configured to generate an average air quality index of the waste management device 102. In an example, a gas sensor is configured to detect the gas leakage. For example, the gas sensor is a methane sensor that measures methane amount each of the plurality of waste bins. 1. Step 220 includes monitoring the waste bin that collects cigarettes (known as cigarette bin) for risk of fire. The gas sensor along with the temperature sensor is configured to ensure no fire occurs in certain bins. In an aspect, a flame sensor is used that is configured to detect as well as react to the occurrence of a fire or flame. 2. Step 222 includes activating the water pump to extinguish the fire if any risk of fire has been detected in the cigarette bin. The water tank is located in the top section of the waste management device 102. Using the water sprinkler unit, located at a certain height of the waste bin, the system 100 is configured to extinguish the detected fire.

During the step of establishing communication 224 between the waste management device 102 and the control station 148, the monitoring unit 142 is configured to receive the reading from the plurality of sensors 134 and send the reading to the communication unit 144. The communication unit 144 communicates one or more data between the control station 148 and the waste management device 102 using the plurality of IoT devices (as shown by step 226). The plurality of IoT devices 146 includes the IoT platform to display the one or more data to the control station (as shown by step 228). In an example, the one or more data to be displayed on a web page include at least one selected from an alert, the fill level, a temperature range, a humidity value, a toxic gas level and a waste bin location.

The step of monitoring the power 230 of the waste management device 102 includes monitoring the power supply of the waste management device 102. Specifically, the microprocessor is configured to monitor State-of-charge (SoC) of the battery (as shown by 232). The SoC of a battery describes the difference between a fully charged battery and the same battery in use. The SoC informs about remaining quantity of electricity available in the battery 234. In an example, the battery 234 is connected to the solar power supply 236 via a charge controller 238. For example, the battery 234 is a 12 V battery. The solar power supply 236 includes a number of flexible solar panel(s) are installed on top of the waste management device 102 in the shape of an umbrella. In an example, a second 12 V battery may be used as a backup battery. The waste management device 102 is configured to operate for up to 3 days on a single charge. The charge controller is an electronic component that controls the amount of charge entering and exiting the battery. The charge controller regulates the optimum and most efficient performance of the battery. The charge controller helps to protect the battery from various issues, including overcharging, current leaking back to the solar panel during the night, the prevention of undervoltage.

In another example, the battery 234 is connected to the AC power source 240 via an alternating current (AC)-direct current (DC) converter. The AC-DC converter 242 is configured to convert an alternating current (AC) into the DC.

The SoC of the battery is communicated to the control station 148 using the communication unit 144. Based on the SoC of the battery, the control station 148 is configured to provide the resultant action. In an example, the resultant action includes replacing of the battery, or providing additional battery acting as a secondary set of battery.

Figure 3C:
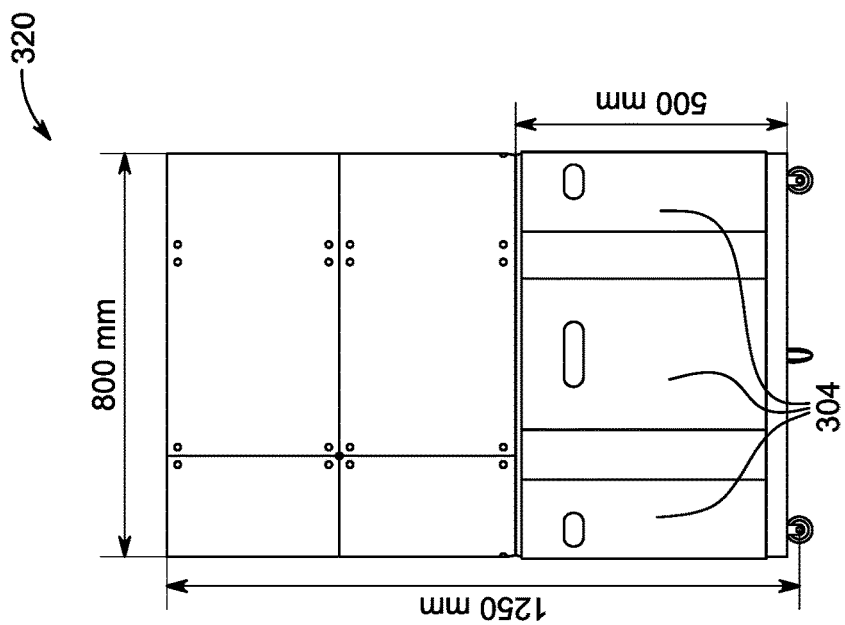
FIG. 3C is a front view of the waste management device, according to another embodiment of the present disclosure.
Figure 3B:
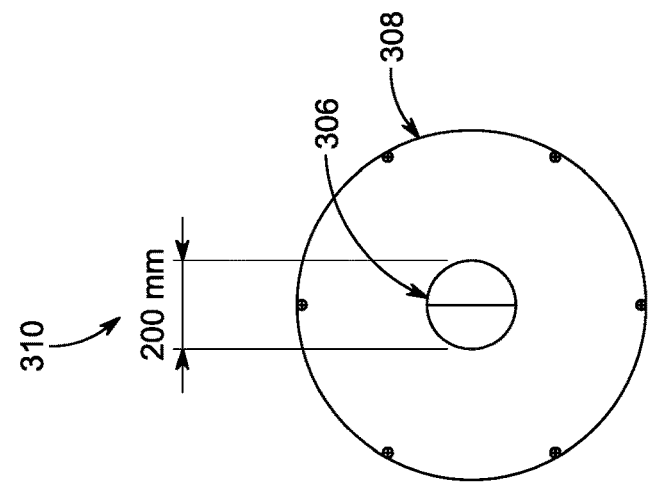
FIG. 3B is a top view of the waste management device, according to another embodiment of the present disclosure.
Figure 3A:
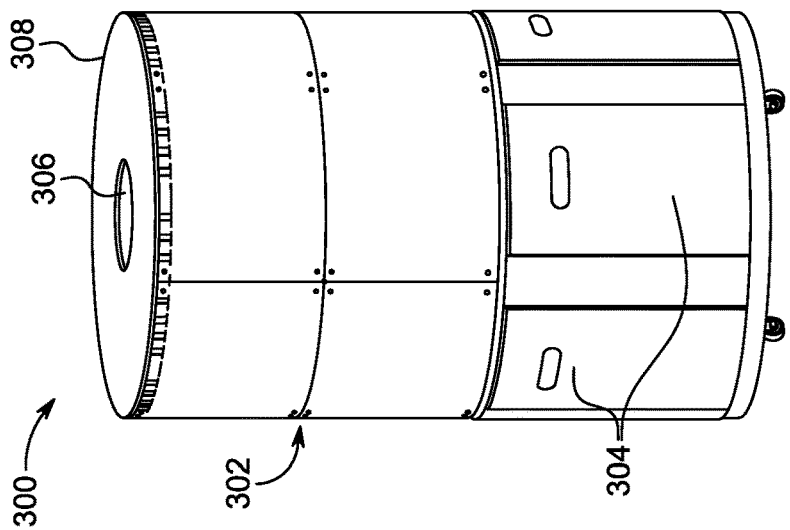
FIG. 3A is an exterior view of a waste management device, according to another embodiment of the present disclosure.

FIG. 3A-FIG. 3C illustrate an overall exterior view of the housing of the waste management device 302.

FIG. 3A is an exterior view 300 of the waste management device 302, according to another embodiment of the present disclosure. In the waste management system, the waste articles are disposed inside the waste management device via an opening 306. The opening 306 acts as an entry for the collection unit 112. The housing includes a cover 308. The waste category is obtained from the classification unit 114, and the stepper motor moves the sorting pipe to the appropriate waste bins 304. The waste management device 302 is divided into two detachable compartments: the top section and the bottom section. The top section of the waste management device 302 extends from the opening 306 at the top of the device 302 to the top of the plurality of waste bins 304. The bottom section of the waste management device 302 comprises a plurality of waste bins. The number of waste bins is equal to the number of categories that the classification unit 114 is trained to classify the waste articles into. In an example, the classification unit 114 classifies a waste article into one of six categories, the waste management device 302 in such an example comprises six waste bins arranged next to each other. In an example, the shape of the waste management device is circular and the shape of each of the six waste bins is conical. Each of the waste bins has a separate door that can be opened from outside to empty the waste bin. Each waste bin is also detachable from the waste management device 102.

As noted earlier, a waste management device may include a lamp which functions to illuminate the collection unit there by permitting capture image capture of a waste article placed inside the waste management device. The lamp preferably includes a plurality of LED imagers on the underside of the top section of the waste management device circling the opening 306. The lamps are evenly spaced around the opening 306 and each is triggered to illuminate when a proximity sensor indicates that a waste article has been placed into the top section of the waste management device. preferably all of the LED mirrors (preferably 12 LED lights evenly spaced proximal to the opening 306) are triggered to illuminate simultaneously. This provides a light source evenly illuminating the waist article from a plurality of angles thereby eliminating shadowing.

An important aspect of the classification unit 114 relates to the ability to identify waste articles that may be burning or smoldering, for example cigarettes that have not been completely extinguished. In this aspect of the waste management device, one or more infrared sensors is mounted on the underside of the cover 308. The infrared camera functions to identify waste articles above a temperature threshold (for example above 150° C., above 180° C., above 200° C., above 250° C., etc.). Waste articles that are on fire or are smoldering are identified as "cigarette" trash and are directed to a cigarette waste bin. The cigarette waste bin includes a top portion cigarette barrier similar to the barrier 408 in the top section. The cigarette barrier opens to permit entry of a waste article identified as a fire/smoldering risk upon identification of such by the classification unit based on input from an IR sensor. The barrier 408 is subsequently returned to a closed state after the fire risk waste article has been transferred to the cigarette waste bin. Then the cigarette waste bin is returned to a closed state. By maintaining the cigarette waste bin in a closed state, any article that is on fire (undergoing combustion), smoldering or otherwise at a temperature greater than a minimum threshold (e.g., 150° C., 180° C., 200° C., or 250° C.) can be quickly starved of oxygen in the cigarette waste bin cavity which is now in a closed state sealed from air.

FIG. 3B is a top view 310 of the waste management device 302, according to another embodiment of the present disclosure. In an example, the opening 306 has a diameter of 200 mm.

FIG. 3C is a front view 320 of the waste management device 302, according to another embodiment of the present disclosure. In an example, the waste management device 302 (housing) has a diameter of 800 mm. The housing has a length of 1250 mm. The waste bin has a length of 500 mm.

In an example, each of the plurality of waste bins is slidable and easy to move into and out of the housing through an opening.

The captured image is processed by the microprocessor using the machine-learning model to classify the waste article. The microprocessor then controls the lower half of the top section, which is the barrier and the sorting pipe, after categorizing the waste article. The stepper motor rotates the sorting pipe to the appropriate bin before opening the barrier and allowing the waste article to pass through the pipe and into the bin located in the bottom section, as also shown in FIG. 4A-FIG. 4B.

Figure 4A:
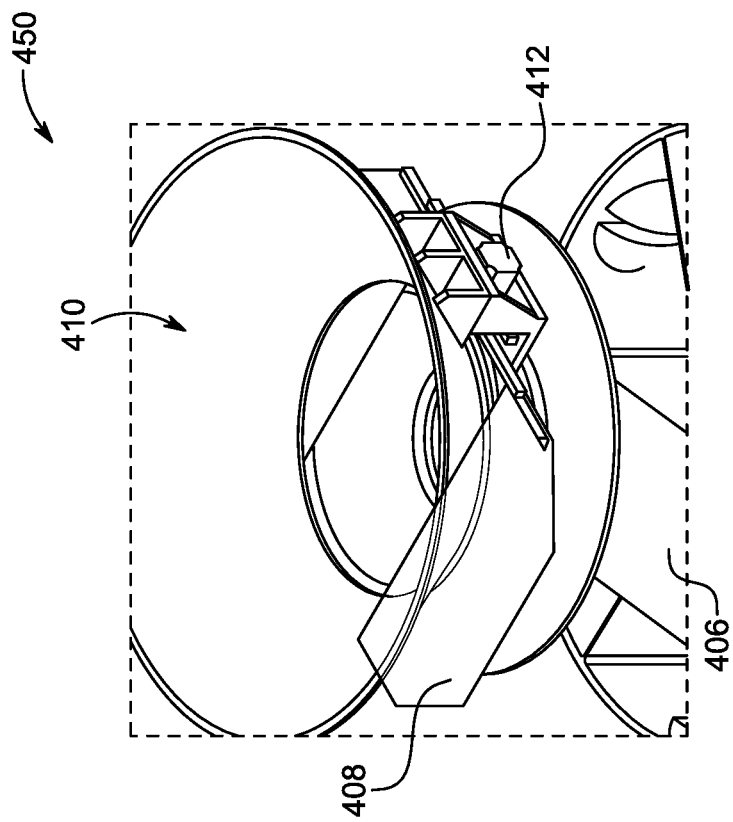
FIG. 4A is an exemplary view of a top section of the waste management device having a sorting pipe and a barrier in a closed state, according to certain embodiments of the present disclosure.

FIG. 4A is an exemplary view 400 of the top section of the waste management device having the sorting pipe 406 and the barrier 408 in a closed state, according to certain embodiments of the present disclosure. The classification unit 114 is located above the barrier 408. The classification unit comprises a lamp, a camera, a proximity sensor, a microprocessor, and a memory. The different components of the classification unit are located on the interior of the collection unit. The sorting pipe 406 of the segregation unit is connected to a lower end of the barrier 408, and the stepper motor 412 is positioned on a top end of the barrier 408. The collection unit 410 collects the one or more waste articles. Once the classification unit 114 identified the waste category of the one or more waste articles, the segregation unit transports the one or more waste articles to the particular waste bin corresponding to the identified waste category. The microprocessor controls the rotation of the sorting pipe 406 using the stepper motor 412. When not in use, the sorting pipe 406 is always be positioned at a selected reference point. The sorting pipe 406 is configured to rotate in a clockwise direction and an anticlockwise direction. The direction of rotation is decided by the microprocessor based on the location of the target bin to ensure movement through the shorted path. The barrier 408 is configured to open only once the waste category of the waste articles has been identified. The barrier 408 is configured to open/close horizontally, as shown in FIG. 4A-FIG. 4B.

Figure 4B:
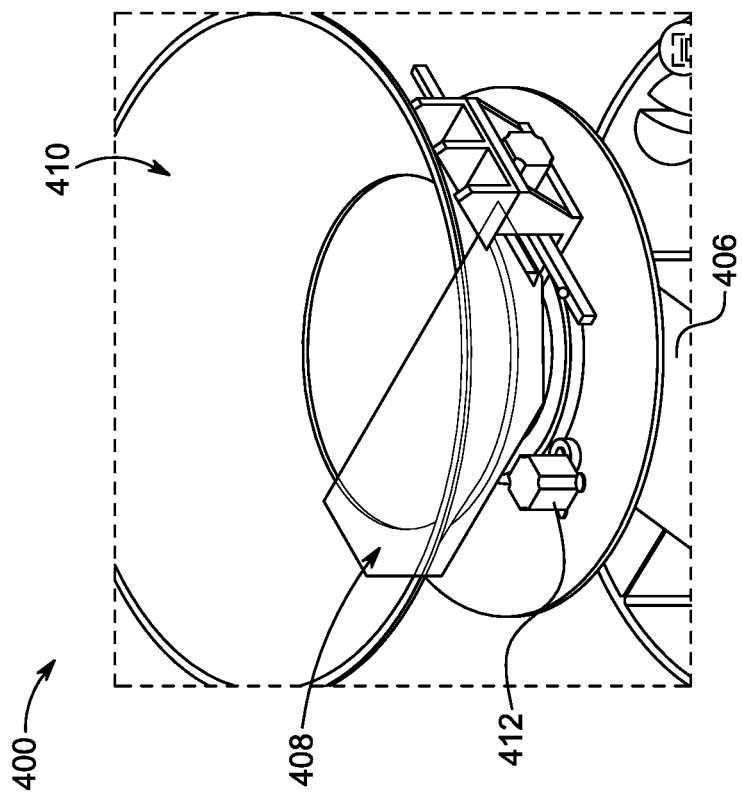
FIG. 4B is an exemplary view of the top section of the waste management device having a barrier in an opened state, according to certain embodiments of the present disclosure.

FIG. 4B is an exemplary view 450 of the top section of the waste management device having the barrier 408 in an opened state, according to certain embodiments of the present disclosure.

Figure 5B:
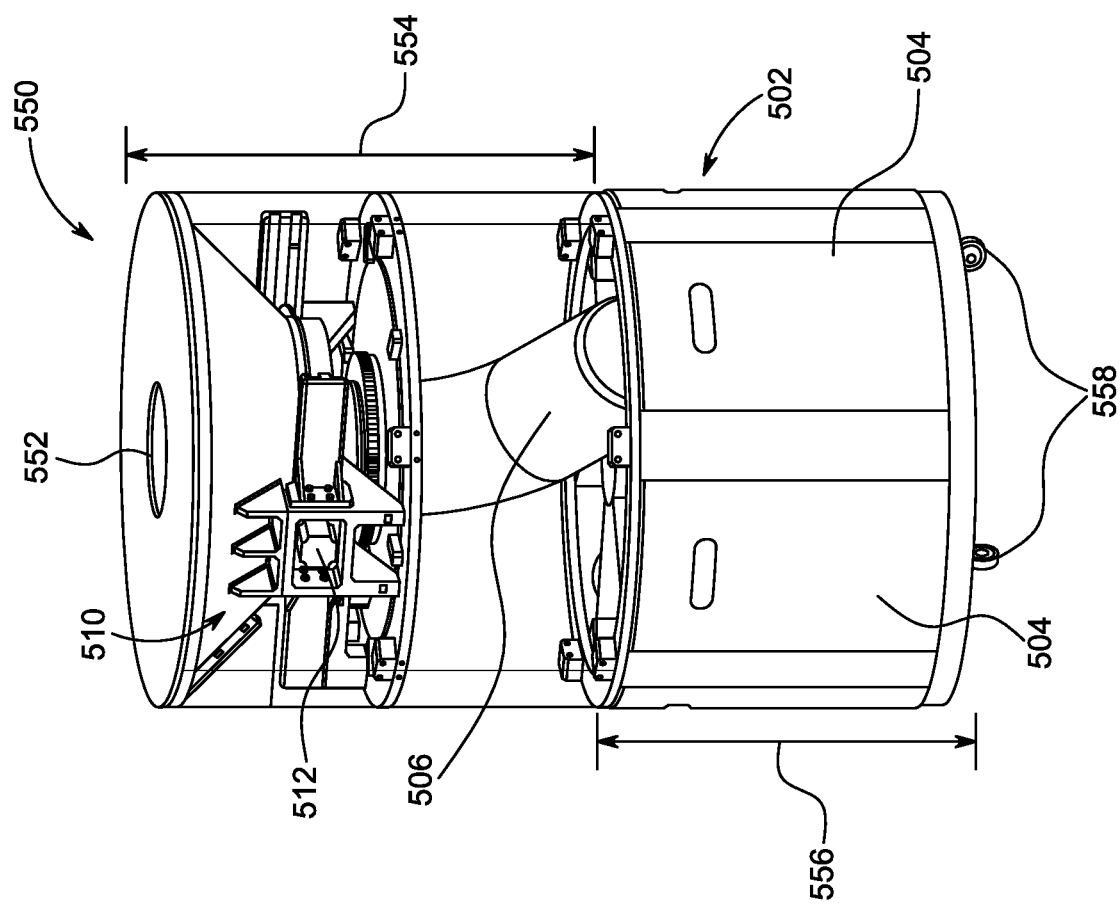
FIG. 5B depicts an interior view of the waste management device, according to certain embodiments of the present disclosure.
Figure 5A:
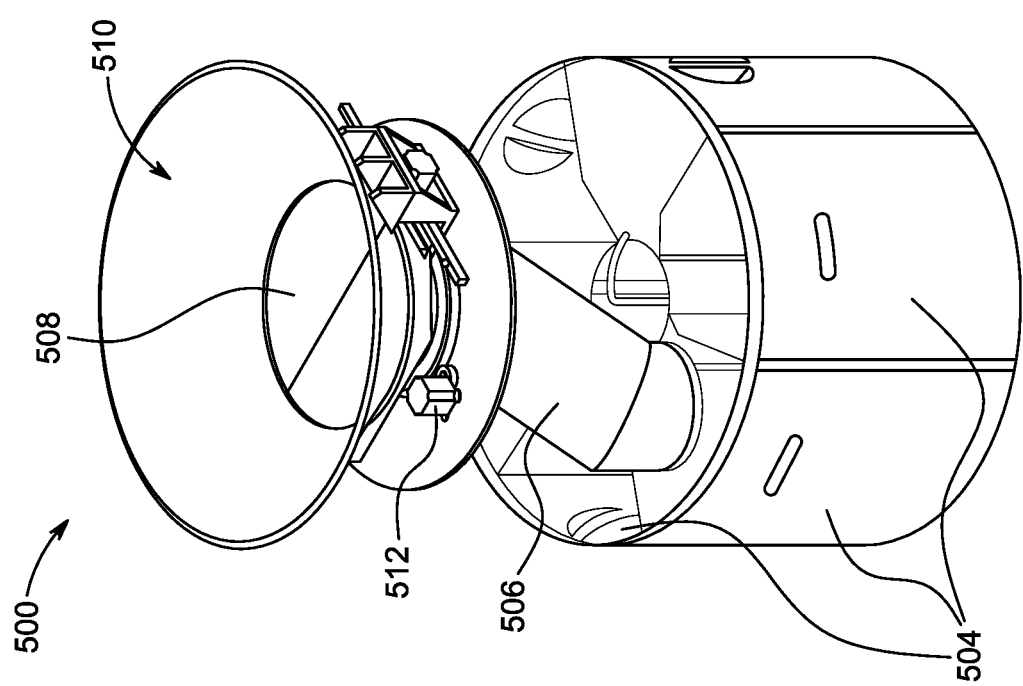
FIG. 5A depicts an internal connection between a collection unit and a plurality of waste bins through a sorting pipe, according to certain embodiments of the present disclosure.

FIG. 5A depicts an internal connection 500 between the collection unit 510 and the plurality of waste bins 504 through the sorting pipe 506, according to certain embodiments of the present disclosure. The barrier 508 is configured to separate the collection unit 510 and the plurality of waste bins 504. The stepper motor 512 is positioned on the barrier 508, to control the sorting pipe 506. Each of the plurality of waste bins 504 is configured to be pulled out with ease for emptying or cleaning purpose.

FIG. 5B depicts an interior view 550 of the waste management device 502, according to certain embodiments of the present disclosure. As shown in FIG. 5B, the waste management device 502 has two sections: the top section 554, and the bottom section 556. The top section 554 includes the collection unit 510, the sorting pipe 506, the barrier 508, and the stepper motor 512. The bottom section 556 includes the plurality of waste bins 504. As shown in FIG. 5B, the waste management device 502 includes a set of wheels 558 such that it is easy to move the waste management device 502.

Figure 6B:
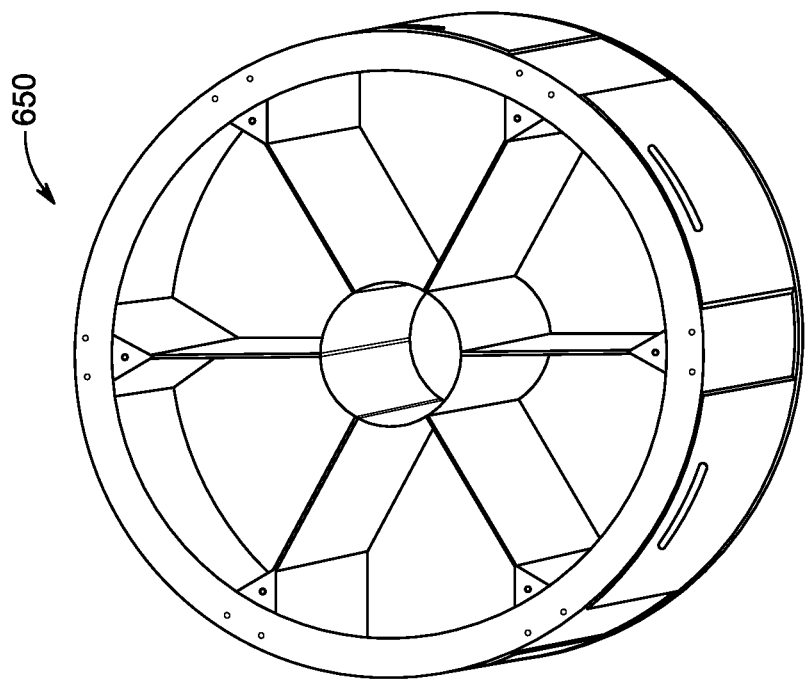
FIG. 6B is a top view of a bottom section of the waste management device, according to certain embodiments of the present disclosure.
Figure 6A:
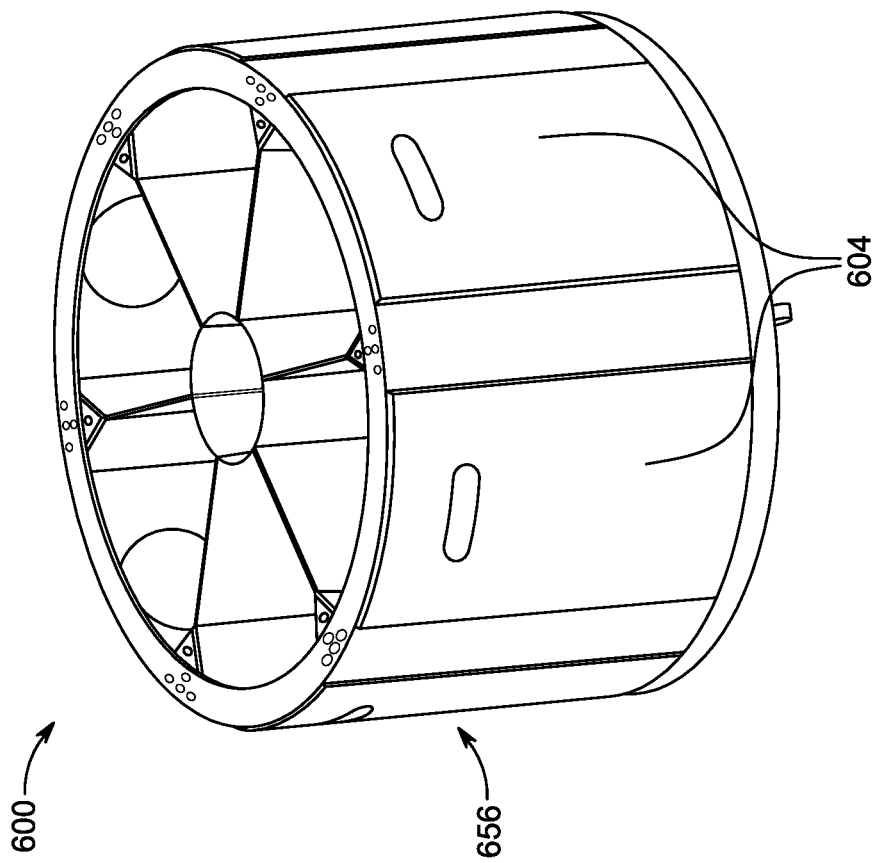
FIG. 6A is a side view of a bottom section of the waste management device, according to certain embodiments of the present disclosure.

FIG. 6A is a side view 600 of the bottom section 656 of the waste management device, according to certain embodiments of the present disclosure. The bottom section 656 includes the plurality of waste bins 604.

FIG. 6B is a top view 650 of the bottom section 656 and/or the top view of the plurality of waste bins 604 of the waste management device, according to certain embodiments of the present disclosure.

EXAMPLES

The following examples describe and demonstrate exemplary embodiments of the waste management system 100 described herein. The examples are provided solely for the purpose of illustration and are not to be construed as limitations of the present disclosure, as many variations thereof are possible without departing from the spirit and scope of the present disclosure.

Experiment 1: Modelling of the Machine-Learning Model

To model the machine-learning model followings steps were performed:

1. Data Collection:

Collecting data is necessary to build a reliable dataset for the machine-learning model. The dataset for the waste management system 100 has a set of predefined specifications. For example, the captured image should have a clear white background. Each captured image must have only one item. The dataset includes an online dataset with images collected from various online sources and a created dataset with captured images during experimentation. In an example, online sources include a waste classification neural network dataset from GitHub, a cigarette dataset from Immersive Limit, a trashnet dataset from Kaggle, and so. For example, the online dataset has approximately 4500 images. The created dataset has approximately 11500 images. To model the machine-learning model, a dataset with a size of approximately 16000 images was used, with an average of 3200 images for each waste category.

2. Data Preprocessing:

After building the dataset, it is essential to convert the dataset to a standardized format by resizing the dimensions of the images to 520×520 pixels in order to obtain an optimal size acting as an input to the microprocessor. The data (captured images) is renamed in a standard form that includes the category name to make it easier to differentiate the images after training.

3. Data Splitting:

The dataset was divided into the following ratio: 70% training set, 15% validation set, and 15% testing set.

4. Choosing a Transfer Model:

The ML model enables the system 100 to classify five different types (plastic, glass, paper, organic waste, and metal). In the present disclosure, MobileNetV2 is employed as a transfer model. The MobileNetV2 is a convolutional neural network architecture. The MobileNetV2 is based on an inverted residual structure where the residual connections are between the bottleneck layers. An intermediate expansion layer uses lightweight depth wise convolutions to filter features as a source of non-linearity. The MobileNetV2 has a small size (approx. 14 MB), a time per inference step on the CPU (25.9 ms), and a time per inference step on the GPU (approx. 3.8 ms). Additionally, the MobileNetV2 has a minimum training loss (2.66%) and a maximum training accuracy (99.28%). Therefore, after 30 epochs of training, the MobileNetV2 achieves 96% overall accuracy in categorizing waste into the five categories, with an average F1 score of 96%. During experiments, Kaggle website was used to create a final machine-learning model. To test the created machine-learning model, a Visual Studio code was utilized to develop a user interface. Visual Studio Code is a code editor redefined and optimized for building and debugging modern web and cloud applications.

5. Implementation of the Transfer Model:

During experimentation, the Visual Studio code was used to create a user interface in which the web camera was connected to the computer and the Kaggle code was integrated to evaluate the transfer model. For example, a HP 325 FHD webcam (manufactured by Hewlett-Packard, located at Palo Alto, 1501 Page Mill Rd, United States) was placed inside the housing representing a prototype of the waste management device. The webcam provides 4K quality, which is a high resolution.

6. Deploying the ML Model into a Hardware Device (Prototype)

The machine-learning model has been implemented on the hardware device. In an example, Edge Impulse, a machine-learning development platform, was used to deploy the ML model. Also, by deploying the ML model on the Arduino® Nicla Vision (manufactured by Arduino, located at Somerville, MA), the model is able to run without an internet connection, with minimal latency and power consumption. The Arduino® Nicla Vision is a ready-to-use, standalone camera for analyzing and processing images on the edge. The Arduino devices are supported by the Edge Impulse platform; therefore, it is easy to integrate the Arduino devices with the other subsystems used in the present system 100.

Figure 7:
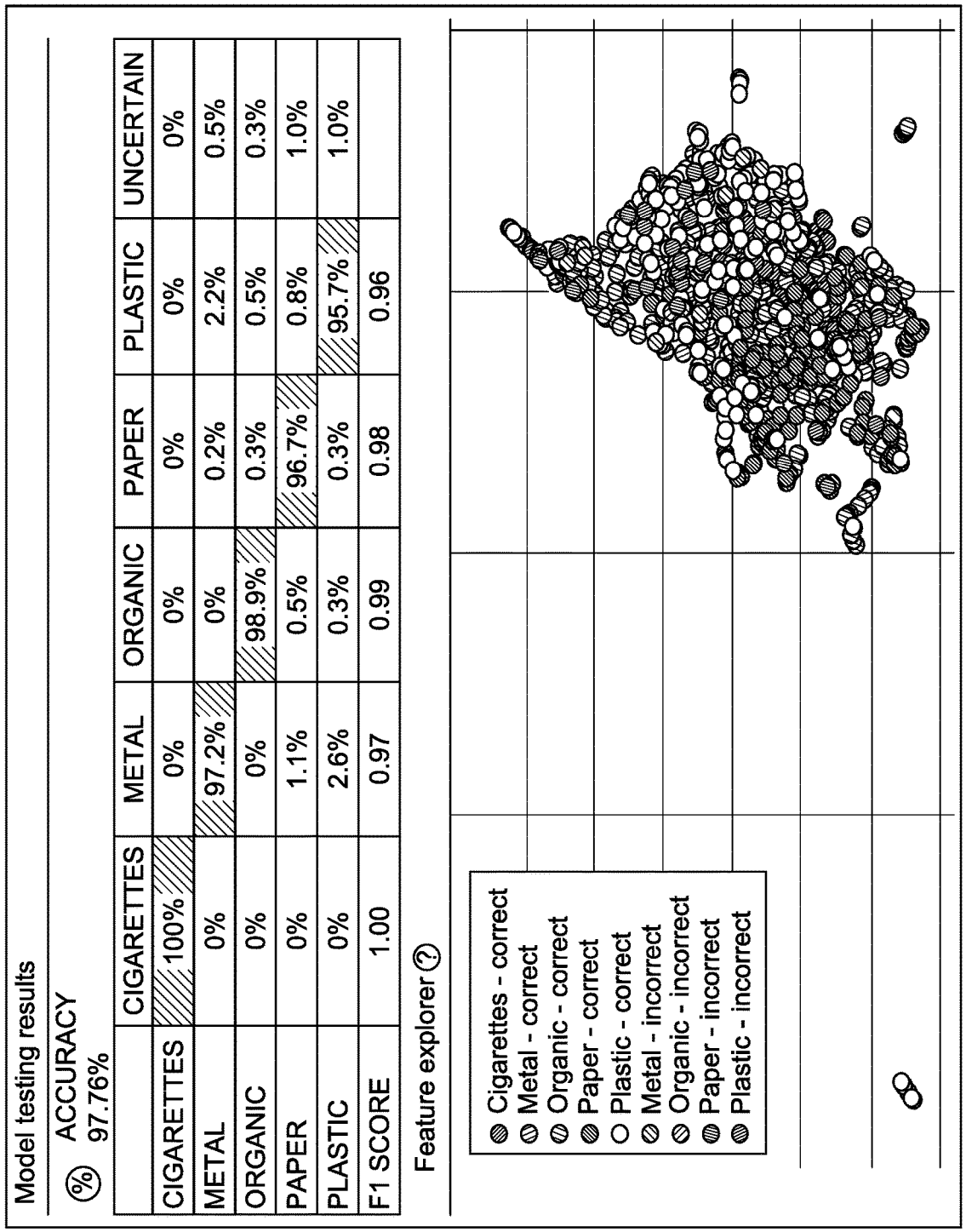
FIG. 7 depicts a testing result of a machine-learning model during an experimental setup, according to certain embodiments of the present disclosure.

FIG. 7 depicts testing result 700 of the machine-learning model during an experimental setup, according to certain embodiments of the present disclosure. The data was uploaded to the platform and the machine-learning model was tested as shown in FIG. 7. The testing accuracy was around 97.76% and the confusion matrix also is shown in FIG. 7. The model was then deployed using the Arduino IDE program. The Arduino® Nicla Vision has the fastest performance such as the interfacing time being 1.208 millisecond, and the peak RAM usage is 1.4 MB, while the Flash usage is 1.7 MB.

Figure 8:
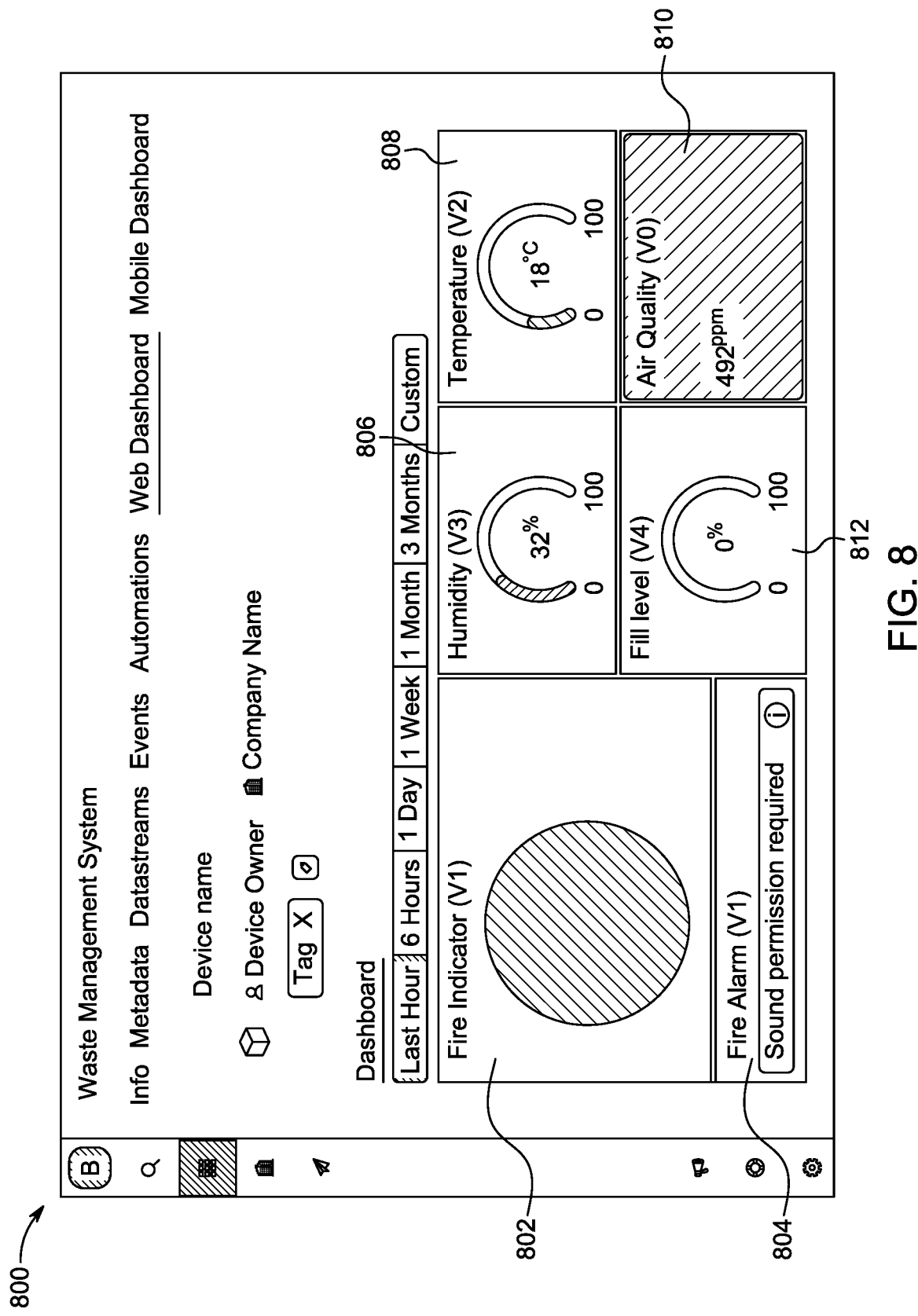
FIG. 8 is a user interface page showing a plurality of readings generated by a plurality of sensors installed within the waste management device, according to certain embodiments of the present disclosure.

FIG. 8 is a user interface page 800 showing a plurality of readings generated by a plurality of sensors 134 installed within the waste management device 102, according to certain embodiments of the present disclosure. The user interface page 800 also displays a fire indicator 802, and a fire alarm 804. When a fire is detected by the flame sensor, a red LED is utilized to indicate the fire, and an alert sound is activated. In case of any fire, an alarm generates sounds on the webpage to alert the concerned parties. In the interface page 800, several similar smart bins status can be displayed and concerned parties are alerted when needed. It may also display several bins in the smart city, as well as the bin location and serial number.

As shown in FIG. 8, the plurality of readings includes a humidity indicator 806, a temperature indicator 808, an air quality indicator 810, and a fill level indicator 812. The humidity indicator 806 displays the value of the humidity of each of the plurality of waste bins measured by the humidity sensor. The temperature indicator 808 displays the value of the temperature of each of the plurality of waste bins measured by the temperature sensor. A first gauge displays the temperature in Celsius with a range of 0 to 100° C. The fill level indicator 812 displays the fill level of each of the plurality of waste bins measured by the ultrasonic sensor. A second gauge is used to display the fill level as a percentage. A third gauge displays the humidity in percentage. The air quality indicator 810 displays the air quality index of each waste bins measured by the air quality sensor. In addition, a label block is utilized to indicate the toxic gases inside the bin and will display the value between 0 and 500 ppm.

The communication unit 144 integrates the plurality of IoT devices 146 with the monitoring unit and controlling unit and streams sensor readings. The communication unit 144 notifies the control station 148 when necessary, such as to empty the bins if they are full. In addition, the communication unit 144 alerts the control station 148 if there is any unexpected problem. In the present disclosure, a Blynk IoT platform is used to design the interface of the control station webpage. The Blynk IoT platform is a cloud-based platform that will allow the display of all sensor values and will facilitate monitoring the fill level, air quality, temperature, humidity, as well as any flame/fire as shown in FIG. 8.

The present disclosure provides an eco-friendly waste management system 100 which uses Wireless Sensor Networks (WSN) to notify a waste management company of the state of each waste bin under their area and advises the waste management company the best times to collect those bins. The waste management system 100 of the present disclosure monitors each bin to notify the control station (management center) to: 1) ensure collection of bins that will be full by the collection time; and 2) that bins with greenhouse gas emissions are collected as early as possible.

In summary, the system 100 of the present disclosure performs real-time waste classification and segregation using the plurality of IoT devices 146 and the machine-learning model.

The system is configured to operate into two subsystems that is, a waste classification subsystem, and a waste segregation subsystem. The waste classification subsystem is automated using the image processing technique and the machine-learning model while the waste segregation part is automated using an electro-mechanical system having the stepper motor and the sorting pipe. The classification part is implemented by the microprocessor and the camera. Images taken by the camera are passed on to the microprocessor which extracts the waste article from the image and classifies it using the machine-learning model. Once a waste article is classified, the microprocessor sends this information to the waste segregation subsystem.

The system is configured to open the cover automatically based on the proximity sensor's output, thereby allowing a hands-free and non-contact waste dispersion. Also, automatic opening of the barrier to release the waste article into its designated bin ensures hygiene standards. The waste segregation subsystem is implemented using electro-mechanical devices which are controlled by the microprocessor. Upon receiving the information about the type of waste article from the classification system, the segregation system releases the waste article into the designated recycle bin.

The system also monitors the fill level of each bin. This reduces the frequency of emptying bins and ensures optimized maintenance and waste management. Thus, it creates an efficient data-driven waste management process which saves time, effort, and money. Reiterating, the system 100 has at least following features: detecting waste articles using image processing and machine-learning algorithms; classifying up to 6 different waste articles (plastic, paper/cardboard, metal, glass, organic, other) with a minimum accuracy of 95%. Classifying one waste articles at a time; segregating waste articles based on types into designated bins using an electromechanical subsystem; measuring the fill level of each bin for maintenance/cleaning schedule; 5Monitoring the presence of certain toxic gasses in the bins; monitoring risk of fire and activates a water sprinkler to douse the fire; communicating data to control stations using plurality of IoT devices 146; capability to operate for three days on full charge; and capability to be powered using solar energy.

An embodiment is illustrated with respect to FIG. 1-FIG. 6. The first embodiment describes a waste management system 100. The system 100 includes a waste management device 102, a monitoring unit 142, and a communication unit 144. The waste management device 102 includes a collection unit 112, a classification unit 114, a segregation unit 132, a plurality of sensors 134, and a power unit 136 in a top section 106 of the waste management device 102. The waste management device 102 includes a plurality of waste bins in a bottom section 108 of the waste management device 102. A barrier 110 is configured to separate the collection unit 114 and the plurality of waste bins. The collection unit 112 is configured to collect one or more waste articles. The classification unit 114 is configured to utilize a machine-learning model and identify a waste category of the one or more waste articles. The segregation unit 132 is configured to transport the one or more waste articles to a particular waste bin corresponding to the identified waste category. The power unit 136 is configured to supply power to the waste management device 102. The monitoring unit 142 configured to monitor the waste management device 102 and control a resultant action. The communication unit 144 configured to communicate one or more data between a control station 148 and the waste management device 102 using a plurality of Plurality of IoT devices 146.

In an aspect, the classification unit 114 of the waste management device 102 further includes a camera 120 configured to capture an image of the one or more waste articles using illumination from a lamp 118; a microprocessor 126 configured to process the machine-learning model 124 using the image; and a proximity sensor 116 configured to activate the camera and the lamp.

In an aspect, the machine-learning model 124 includes a dataset, wherein the dataset comprises a plurality of images of waste articles.

In an aspect, the microprocessor 126 is further configured to control the segregation unit 132 of the waste management device 102.

In an aspect, the segregation unit 132 of the waste management device 102 further includes a sorting pipe configured to dispose the one or more waste articles to the plurality of waste bins.

In an aspect, the segregation unit 132 of the waste management device 102 further includes a stepper motor configured to control a rotation of the sorting pipe.

In an aspect, the sorting pipe further includes a plurality of IR sensors.

In an aspect, the IR sensors are configured to select the particular waste bin out of the plurality of waste bins corresponding to the identified waste category.

In an aspect, the sorting pipe is configured to rotate in a clockwise direction and an anticlockwise direction.

In an aspect, the plurality of sensors 134 are attached to the sorting pipe.

In an aspect, the plurality of sensors 134 of the waste management device are selected from a gas sensor, a smoke sensor, a temperature sensor, and an ultrasonic sensor.

In an aspect, the ultrasonic sensor is configured to check a fill level of each of the plurality of waste bins.

In an aspect, the waste management device 102 further includes a water tank and a water sprinkler unit.

In an aspect, the monitoring unit 142 is further configured to receive a reading from the plurality of sensors 134 and send the reading to the communication unit 144.

In an aspect, the monitoring unit 142 is further configured to receive the resultant action from the communication unit 144.

In an aspect, the Plurality of IoT devices 146 include an IoT platform to display the one or more data to the control station 148.

In an aspect, the one or more data generated using the Plurality of IoT devices 146 include at least one selected from an alert, the fill level, a temperature range, a humidity value, a toxic gas level and a waste bin location.

In an aspect, the plurality of waste bins of the waste management device are arranged adjacent to each other.

In an aspect, the identified waste category is at least one from a paper, a plastic, a metal, a glass, an organic waste, and a cigarette.

In an aspect, the power unit 136 of the waste management device includes a solar power supply, a battery, and an AC power source.

Next, further details of the hardware description of the computing environment of FIG. 1 according to exemplary embodiments is described with reference to FIG. 9.

Figure 9:
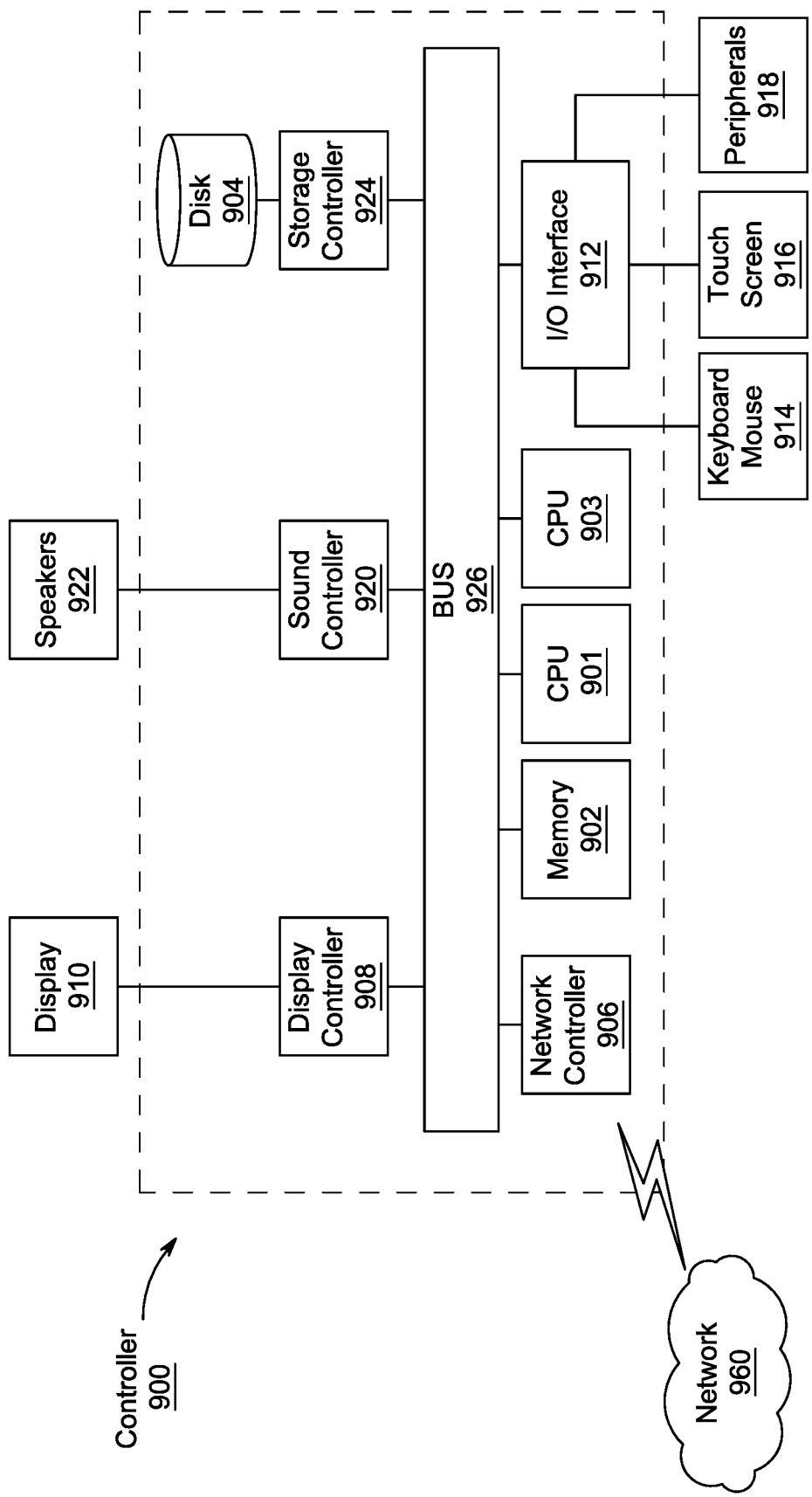
FIG. 9 is an illustration of a non-limiting example of details of computing hardware used in the computing system, according to certain embodiments of the present disclosure.

In FIG. 9, a controller 900 is described as representative of the waste management system 100 of FIG. 1 in which each of the microprocessor 126, the control station 148 is a computing device which includes a CPU 901 which performs the processes described above/below. FIG. 9 is an illustration of a non-limiting example of details of computing hardware used in the computing system, according to exemplary aspects of the present disclosure. In FIG. 9, a controller 900 is described which is a computing device (that includes the microprocessor 126) and includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of the ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
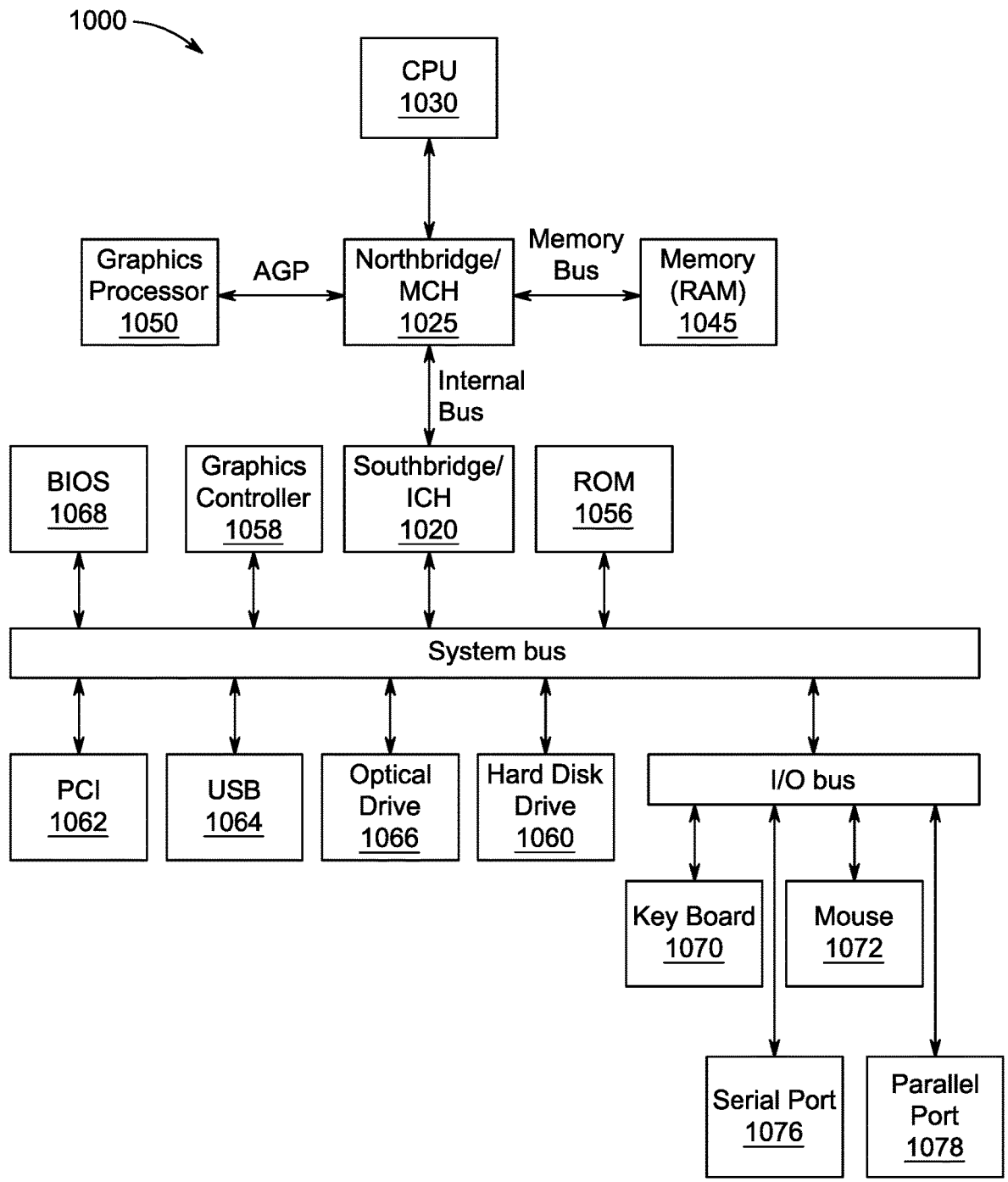
FIG. 10 is an exemplary schematic diagram of a data processing system used within the computing system, according to certain embodiments of the present disclosure.

FIG. 10 shows a schematic diagram of a data processing system 1000 used within the computing system, according to exemplary aspects of the present disclosure. The data processing system 1000 is an example of a computer in which code or instructions implementing the processes of the illustrative aspects of the present disclosure may be located.

In FIG. 10, data processing system 1080 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
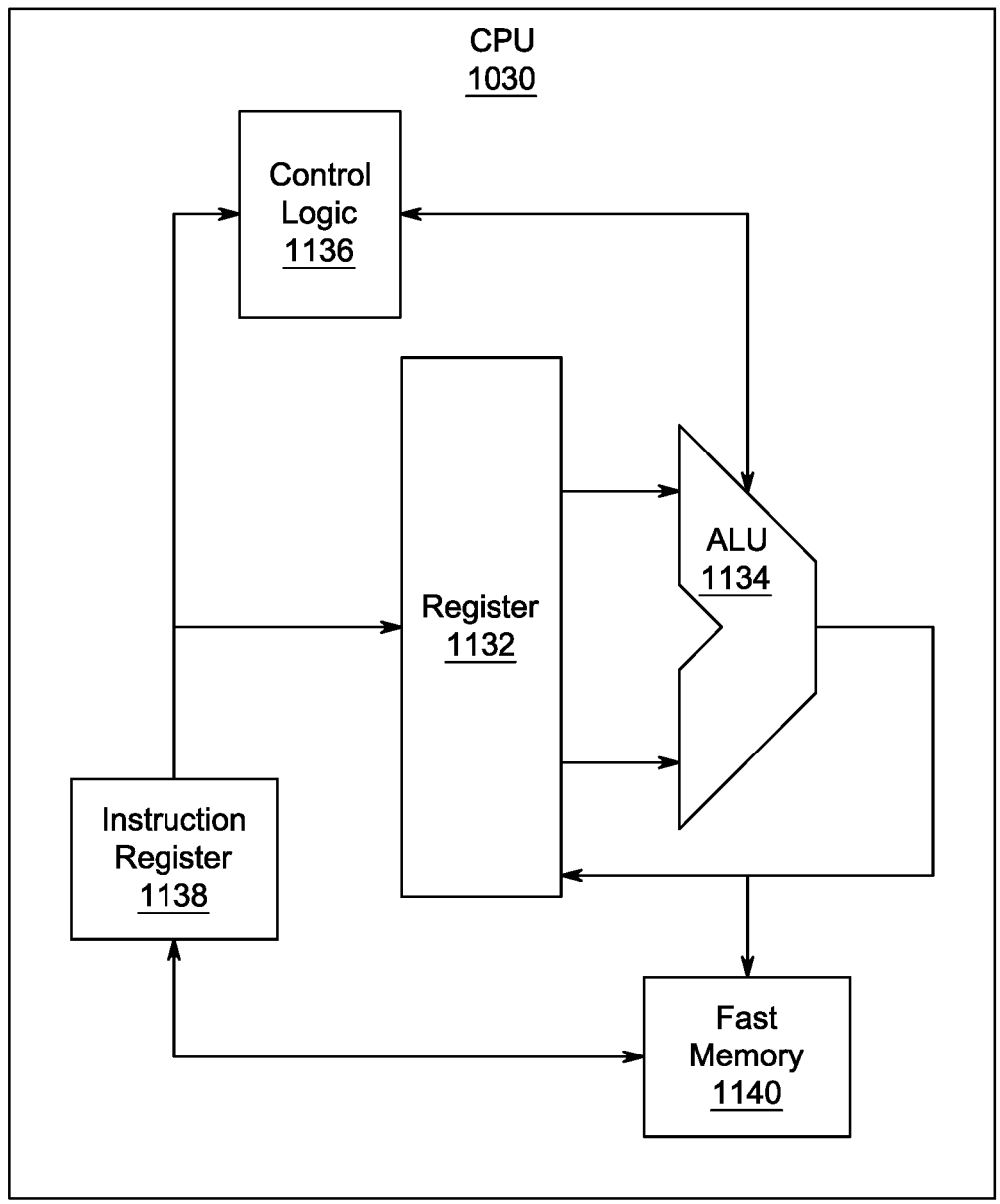
FIG. 11 is an exemplary schematic diagram of a processor used with the computing system, according to certain embodiments of the present disclosure.

For example, FIG. 11 shows one aspects of the present disclosure of CPU 1030. In one aspects of the present disclosure, the instruction register 1138 retrieves instructions from the fast memory 1140. At least part of these instructions is fetched from the instruction register 1138 by the control logic 1136 and interpreted according to the instruction set architecture of the CPU 1130. Part of the instructions can also be directed to the register 1132. In one aspects of the present disclosure the instructions are decoded according to a hardwired method, and in another aspect of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain aspects of the present disclosures, the instruction set architecture of the CPU 1130 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1180 can include that the SB/ICH 1120 is coupled through a system bus to an I/O Bus, a read only memory (ROM) 1156, universal serial bus (USB) port 1164, a flash binary input/output system (BIOS) 1168, and a graphics controller 1158. PCI/PCIe devices can also be coupled to SB/ICH 1120 through a PCI bus 1162.

The PCI devices may include, for example, Ethernet adapters, add-in cards, and PC cards for notebook computers. The Hard disk drive 1160 and CD-ROM 1156 can use, for example, an integrated drive electronics (IDE) or serial advanced technology attachment (SATA) interface. In one aspect of the present disclosure the I/O bus can include a super I/O (SIO) device.

Further, the hard disk drive (HDD) 1160 and optical drive 1166 can also be coupled to the SB/ICH 1120 through a system bus. In one aspects of the present disclosure, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
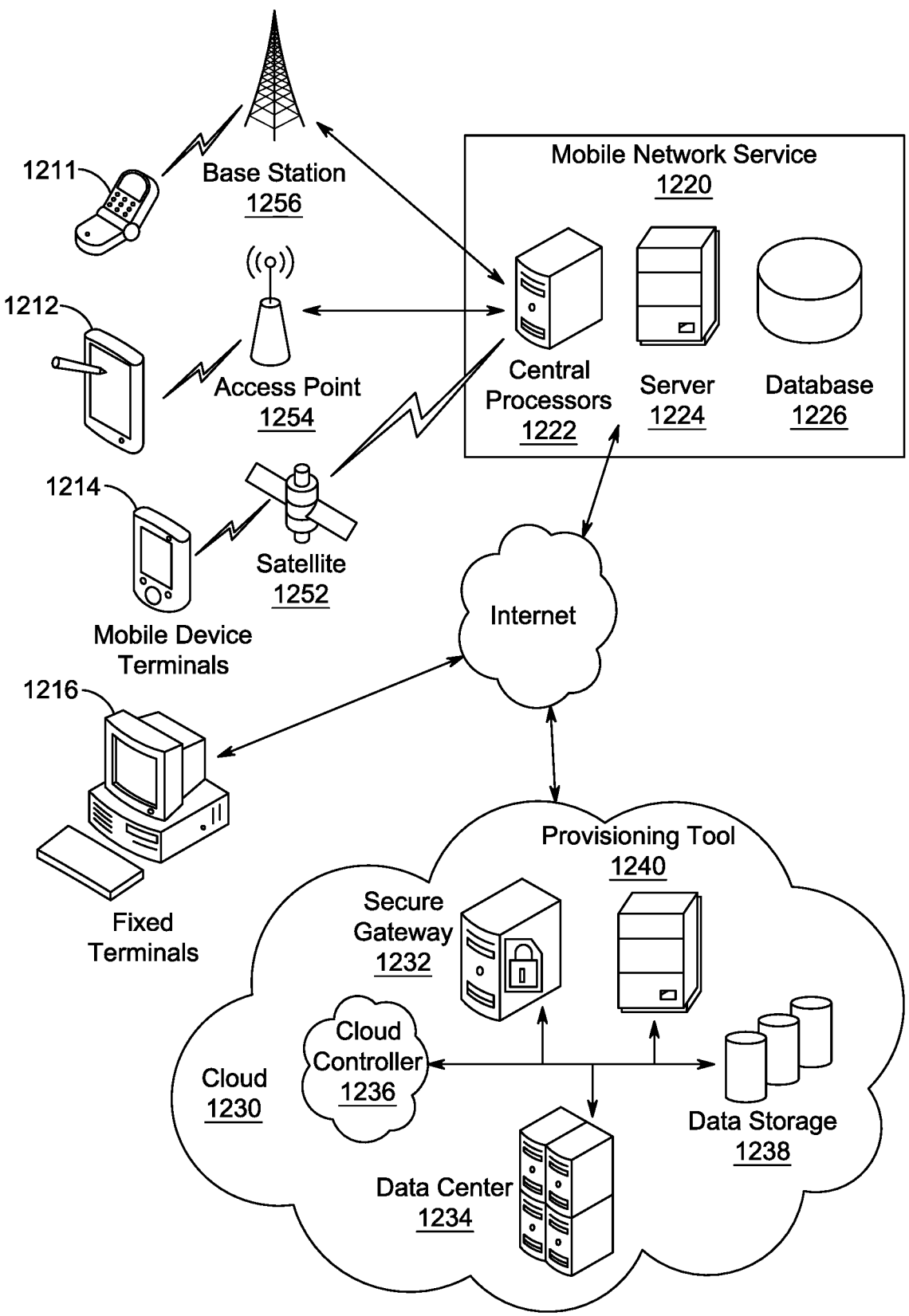
FIG. 12 is an illustration of a non-limiting example of distributed components which may share processing with the controller, according to certain embodiments of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including smart phone 1211, tablet 1212, mobile device terminal 1214 and fixed terminals 1216. These client devices may be commutatively coupled with a mobile network service 1220 via base station 1256, access point 1254, satellite 1252 or via an internet connection. Mobile network service 1220 may comprise central processors 1222, server 1224 and database 1226. Fixed terminals 1216 and mobile network service 1220 may be commutatively coupled via an internet connection to functions in cloud 1230 that may comprise security gateway 1232, data center 1234, cloud controller 1236, data storage 1238 and provisioning tool 1240. The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein. Numerous modifications and variations of the present disclosure are possible in light of the above teachings. It is therefore to be understood that within the scope of the appended claims, the invention may be practiced otherwise than as specifically described herein.

The invention claimed is:

1. A waste management system, comprising:
    a waste management device, comprising a collection unit, a classification unit, a segregation unit, a plurality of sensors, a barrier, and a power unit in a top section of the waste management device and a plurality of waste bins in a bottom section of the waste management device;
    wherein the collection unit is configured to collect one or more waste articles;
    wherein the classification unit comprises
        a proximity sensor, a camera and a lamp mounted on an interior surface of the collection unit; wherein the proximity sensor is configured to sense the one or more waste articles in the collection unit and activate the camera and the lamp; wherein the lamp is configured to illuminate the collection unit having the one or more waste articles, and wherein the camera is configured to capture an image of the one or more waste articles in the collection unit; and
        a machine-learning model trained to identify a waste category of the one or more waste articles using the image captured by the camera;
    wherein the segregation unit comprises a sorting pipe and a stepper motor, wherein the sorting pipe is configured to transport the one or more waste articles from the collection unit to a particular waste bin of the plurality of waste bins in the bottom section of the waste management device corresponding to the identified waste category; and
    wherein the power unit is configured to supply power to the waste management device;
    a monitoring unit configured to monitor the waste management device; and
    a communication unit configured to communicate one or more data between the monitoring unit and a control station using a plurality of IoT devices.

2. The waste management system of claim 1, wherein the classification unit of the waste management device comprises a microprocessor configured to process the machine-learning model to identify the waste category using the image of the one or more waste articles,
    wherein the classification unit further comprises an IR sensor configured to identify a temperature above a trigger threshold indicative of a burning or smoldering waste article,
    wherein the microprocessor is configured to identify the burning or smoldering waste article as a cigarette and the segregation unit is configured to direct the burning or smoldering waste article in a cigarette waste bin comprising a separation plate, and
    wherein the separation plate is triggered to open and permit passage of the burning or smoldering waste into a cavity of the cigarette waste bin then close and seal the burning or smoldering waste in the cigarette waste bin.

3. The waste management system of claim 2, wherein the microprocessor is further configured to control the segregation unit of the waste management device.

4. The waste management system of claim 1, wherein the machine-learning model comprises a dataset, wherein the dataset comprises a plurality of images of waste articles.

5. The waste management system of claim 1, wherein a top end of the sorting pipe of the segregation unit is connected to a bottom end of the collection unit.

6. The waste management system of claim 1, wherein the stepper motor of the segregation unit is configured to control a rotation of the sorting pipe.

7. The waste management system of claim 1, wherein the stepper motor of the segregation unit is positioned on a top side of the barrier and the sorting pipe of the segregation unit is connected to the collection unit through a bottom side of the barrier, wherein the barrier is a flat plate coupled to a bottom side of the collection unit.

8. The waste management system of claim 1, wherein a plurality of IR sensors are coupled to a distal end of the sorting pipe of the segregation unit.

9. The waste management system of claim 1, wherein the sorting pipe of the segregation unit is configured to rotate in a clockwise direction and an anticlockwise direction.

10. The waste management system of claim 1, wherein the barrier is configured to separate the collection unit from the plurality of waste bins.

11. The waste management system of claim 1, wherein the plurality of sensors of the waste management device comprises at least two selected from the group consisting of a gas sensor, a smoke sensor, a temperature sensor, and an ultrasonic sensor.

12. The waste management system of claim 11, wherein each waste bin of the plurality of waste bins includes the ultrasonic sensor, wherein each ultrasonic sensor is mounted proximal to an open top of a corresponding waste bin, and is configured to check a fill level of each of each waste bin of the plurality of waste bins.

13. The waste management system of claim 1, wherein the waste management device further comprises a water tank and a water sprinkler unit.

14. The waste management system of claim 1, wherein the monitoring unit is further configured to receive a reading from the plurality of sensors and send the reading to a control station through the communication unit.

15. The waste management system of claim 14, wherein the monitoring unit is further configured to receive a resultant action from the control station through the communication unit.

16. The waste management system of claim 1, wherein the IoT devices of the communication unit include an IoT platform to display the one or more data to the control station.

17. The waste management system of claim 1, wherein the one or more data generated using the IoT devices include at least one selected from the group consisting of an alert, the fill level, a temperature range, a humidity value, a toxic gas level and a waste bin location.

18. The waste management system of claim 1, wherein the plurality of waste bins of the waste management device are arranged adjacent to each other.

19. The waste management system of claim 1, wherein the identified waste category is at least one selected from the group consisting of a paper, a plastic, a metal, a glass, an organic waste, and a cigarette.

20. The waste management system of claim 1, wherein the power unit of the waste management device comprises a solar power supply, a battery, and an AC power source.

* * * * *